US011722950B2

(12) United States Patent
Qi et al.

(10) Patent No.: US 11,722,950 B2
(45) Date of Patent: Aug. 8, 2023

(54) ENHANCED NEIGHBOR AWARENESS NETWORKING IN 6 GHZ FREQUENCY BANDS

(71) Applicant: Intel Corporation, Santa Clara, CA (US)

(72) Inventors: Emily H. Qi, Gig Harbor, WA (US); Po-Kai Huang, San Jose, CA (US); Laurent Cariou, Portland, OR (US); Hassan Yaghoobi, San Jose, CA (US); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 264 days.

(21) Appl. No.: 17/092,124

(22) Filed: Nov. 6, 2020

(65) Prior Publication Data
US 2021/0058856 A1 Feb. 25, 2021

Related U.S. Application Data

(60) Provisional application No. 62/931,920, filed on Nov. 7, 2019.

(51) Int. Cl.
*H04W 48/16* (2009.01)
*H04W 76/14* (2018.01)
*H04W 72/0453* (2023.01)
*H04W 84/12* (2009.01)

(52) U.S. Cl.
CPC ....... *H04W 48/16* (2013.01); *H04W 72/0453* (2013.01); *H04W 76/14* (2018.02); *H04W 84/12* (2013.01)

(58) Field of Classification Search
None
See application file for complete search history.

(56) References Cited

U.S. PATENT DOCUMENTS

| | | | | |
|---|---|---|---|---|
| 2015/0319596 A1* | 11/2015 | Qi | ..................... | H04W 52/0293 455/41.2 |
| 2016/0112987 A1* | 4/2016 | Patil | .................... | H04W 74/002 455/515 |
| 2019/0007485 A1* | 1/2019 | Kim | ...................... | H04W 8/005 |

\* cited by examiner

*Primary Examiner* — Jinsong Hu
*Assistant Examiner* — Alexander J Yi
(74) *Attorney, Agent, or Firm* — Eversheds Sutherland (US) LLP

(57) ABSTRACT

This disclosure describes systems, methods, and devices related to neighbor awareness networking (NAN) operations in the 6 GHz frequency band. A NAN device may generate a first NAN frame including a first indication of a NAN operation capability, and a second indication of a transmit power of the NAN device. The NAN device may send the first NAN frame and may identify a second NAN frame received from a second NAN device, the second NAN frame including a third indication of the NAN operation capability, and a fourth indication of a transmit power of the second NAN device. The NAN device may determine, based on the transmit power of the NAN device and the transmit power of the second NAN device, an operation parameter for the 6 GHz frequency band. The NAN device may establish, based on the operation parameter, a NAN connection using the 6 GHz frequency band.

20 Claims, 12 Drawing Sheets

ENHANCED NEIGHBOR AWARENESS NETWORKING IN 6 GHZ FREQUENCY BANDS

CROSS-REFERENCE TO RELATED APPLICATIONS

This application is related to and claims priority to U.S. Provisional Patent Application No. 62/931,920, filed Nov. 7, 2019, which is hereby incorporated herein by reference in its entirety.

TECHNICAL FIELD

This disclosure generally relates to systems and methods for wireless communications and, more particularly, to neighbor awareness networking (NAN) operations in 6 GHz bands.

BACKGROUND

Wireless devices are becoming widely prevalent. Recently, there has been a shift in technology to support direct wireless communications between wireless devices. Neighbor awareness networking (NAN) may refer to a specification for Wi-Fi for device and/or service discovery and peer-to-peer communication. NAN may describe the formation of a cluster of devices (referred to as a NAN cluster) for devices in physical proximity to one another.

DETAILED DESCRIPTION

Figure 1A:
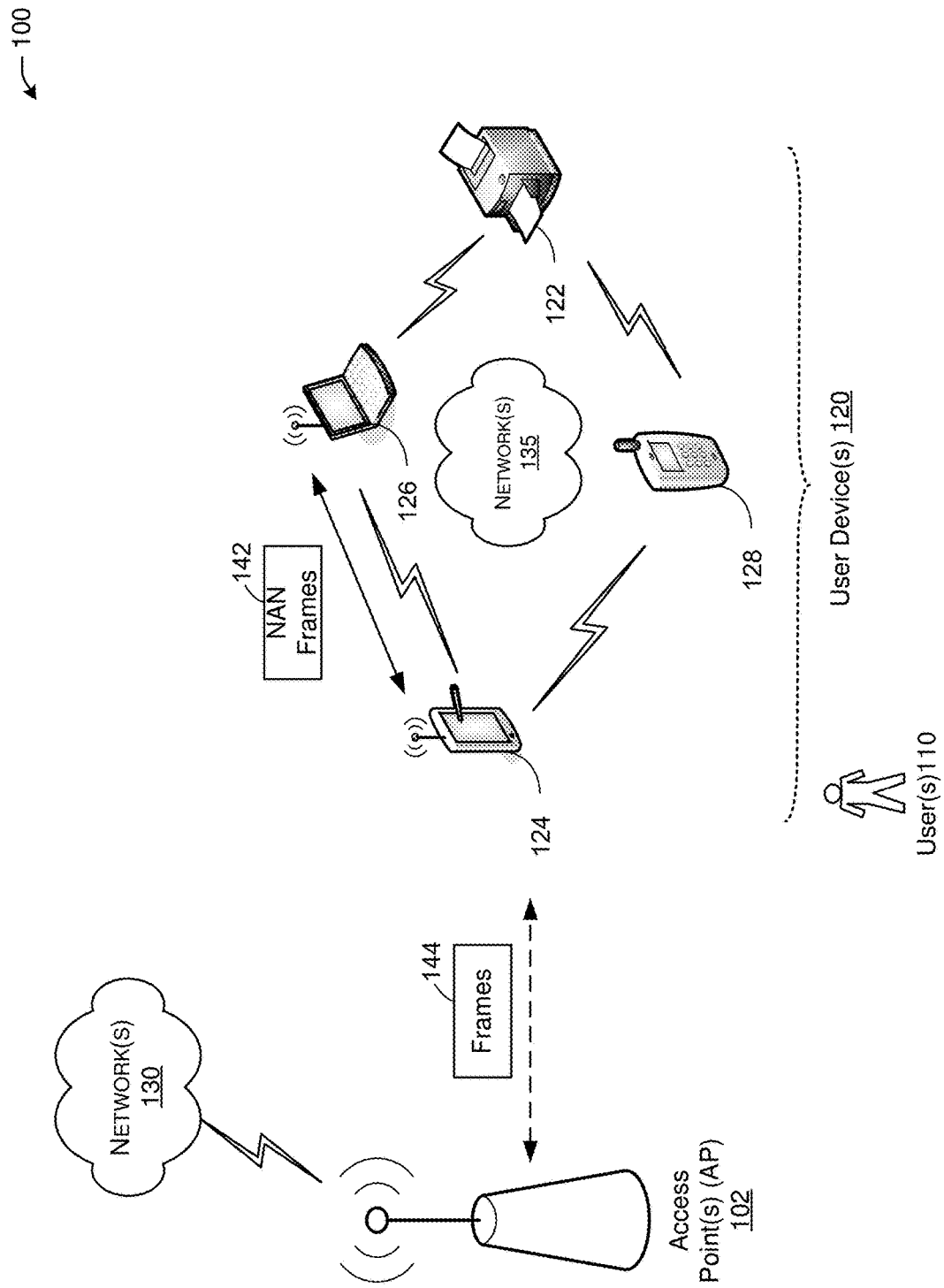
FIG. 1A is a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Neighbor awareness networking (NAN) is a specification defining the way that Wi-Fi devices may discover and establish NAN data path (NDP) communications, NAN device discovery, and NAN ranging with other NAN devices in their close proximity. NDP communications allow station devices (STAs) to communicate with one another without requiring a connection with an access point (AP). A NAN ranging operation allows two NAN devices to determine the distance between them. In contrast, AP infrastructure communications refer to STAs in a basic service set (BSS) provided by an AP. NAN devices (e.g., devices capable of NAN operations) in proximity to one another may form NAN device clusters. Devices in the same NAN cluster follow the same awake time schedule, referred to as a discovery window (DW) to facilitate cluster formation and allow low-power operations. During the DWs, the devices may transmit NAN Service Discovery Frames (SDF) to subscribe or publish the services that the devices are interested in or provide, the frequency bands in which the devices are available, and the times at which the devices are available in the indicated frequency bands. Once a NAN device identifies a service that it intends to use, the NAN device may establish an NDP or NAN ranging with a peer device that indicates a capability of using/providing the service.

The Wi-Fi Aware (NAN)-3.0 protocol allows NAN Discovery, NAN Data Path, and NAN ranging operations in 2.4 GHz and 5 GHz. To operate Wi-Fi in 6 GHz, however, there is a need to establish NAN communications in a 6 GHz frequency band.

In particular, the 6 GHz frequency band is shared by other non-Wi-Fi communications, and is governed by restrictions that are not applicable to other Wi-Fi enabled frequency bands (e.g., 2.4 GHz, 5 GHz, etc.). For example, unlicensed Wi-Fi devices using wireless communications in the 6 GHz frequency band may be required to support automated frequency coordination (AFC). In this manner, for a NAN device to establish NDP communications in a 6 GHz frequency band, the NAN device must meet regulatory and other requirements for operating in the 6 GHz frequency band. To determine whether a NAN device meets the requirements for operating in the 6 GHz frequency band, NAN devices may exchange information in NAN frames that they otherwise do not have a reason to exchange in some other frequency bands.

To maximize spectrum utilization, various spectrum sharing mechanisms are becoming increasingly popular. Spectrum sharing mechanisms need to protect incumbent devices in various bands. AFC is a geo-location based mechanism to identify available frequency for license-exempt secondary use while ensuring incumbent device protection in the band. As an example, AFC mechanism is being used in the 6 GHz band to protect incumbent devices against interference. In AFC systems, allowable frequencies and allowable maximum transmit power of secondary users are determined based on an agreed Interference Protection Criteria (e.g., I/N Interference over Noise ratio). Locations of secondary user devices are used to determine allowable frequencies and allowable maximum transmit power of secondary users (e.g., Wi-Fi devices) in proximity of the incumbent receivers (e.g., non-Wi-Fi devices). AFC may be required for standard power Wi-Fi certified devices in the 6 GHz band (5925-7125 MHz).

Due to the nature of NAN operations, an infrastructure network (e.g., STAs connected to an AP) may not be available for a NAN device to access the 6 GHz frequency band when the NAN device begins a NAN operation. There is therefore a need for a mechanism to allow NAN devices to communicate their abilities to access a 6 GHz frequency/channel, or more specifically, to communicate an AFC capability, Very Low Power (VLP) and Low Power Indoor (LPI) capability, and use this information to establish NAN operations (including NAN Data Paths and NAN Ranging) in 6 GHz bands.

Example embodiments of the present disclosure relate to systems, methods, and devices for neighbor awareness networking (NAN) data path operation in 6 GHz bands.

In one or more embodiments, a NAN device with AFC capability means the device has access to 6 GHz spectrum availability information where authorized. A NAN device may have 6 GHz automated frequency coordination (e.g., AFC) frequency/channel availability information through various means, such as 1) being an standalone AFC System with frequency/channel availability calculation engine, 2) receiving the information from an AFC Device (e.g., an AFC enabled AP), or other means. A NAN device that supports 6 GHz bands may indicate an ability to access 6 GHz bands, and at which times, in a Device Capability Attribute (e.g., defined by the WFA Wi-Fi Aware Technical Specification, such as the Device Capability Attribute defined for NAN management frames). For example, the NAN device may send NAN frames in other frequency bands, such as the 2.4 GHz and/or 5 GHz bands, and may use the NAN frames to indicate capabilities of using other frequency bands (e.g., the 6 GHz frequency band or other bands). A NAN device that supports 6 GHz operation and that has "valid" 6 GHz frequency/channel availability information may advertise the 6 GHz capability in a Device Capability Attribute. If two NAN devices are to establish a NAN Data Path between them, at least one of the devices must have "valid" 6 GHz frequency/channel availability information. Where and when to operate NAN operations may be negotiated/communicated by including 6 GHz available frequencies and/or channels information in the NAN Availability attribute. When advertising its NAN availability in 6 GHz, a NAN device may indicate the maximum transmit power or usage for the corresponding NAN availability. For example, indicate whether the NAN Availability is used for very low power (VLP), low power indoor (LPI), or Standard Power AFC controlled. 6 GHz frequency/channel availability information can be shared via NAN Availability or any other formats after the NAN Data Path setup between two NAN devices. Shared 6 GHz frequency/channel availability information may be used for the NAN schedule negotiation or NAN schedule update of the NAN Data Path between these two NAN devices. To use VLP and LPI transmit power operating modes in the 6 GHz frequency band, both NAN devices may need to be VLP or LPI, so when both NAN devices advertise that they may use VLP and LPI transmit power operating modes, the NAN devices may determine that no AFC capability is required.

In one or more embodiments, a NAN device's transmission power and whether the NAN device is an indoor or outdoor device may determine whether the NAN device may conduct NAN operations in the 6 GHz frequency band. There are multiple transmit power operating modes in the 6 GHz frequency band. In particular, devices in the 6 GHz frequency band may be qualified as VLP indoor/outdoor devices when having a transmission power from 4 dBm-14 dBm. Devices in the 6 GHz frequency band may be qualified as standard power (SP) AFC indoor/outdoor devices when having a transmission power from 30 dBm (17 db/MHz)-36 dBm (23 dBm/MHz). Devices in the 6 GHz frequency band may be qualified as low-power indoor (LPI) devices when having a transmission power from 24 dBm (−1 db/MHz)-30 dBm (5 dBm/MHz). For LPI devices, no AFC capability may be required for NAN devices to conduct NAN operations with one another. For SP devices, at least one NAN device must have AFC capabilities for NAN devices to conduct NAN operations with one another. VLP NAN devices do not need AFC. Therefore, based on the transmission powers of two NAN devices attempting to access the 6 GHz band to conduct NAN operations with each other, the NAN devices may determine device criteria (e.g., operation parameters) that need to be satisfied before establishing NAN operations in the frequency band.

In one or more embodiments, NAN devices may advertise and communicate their 6 GHz and AFC capabilities, NAN Availability associated with each transmit power operating mode, whether a device's power supply is from a wired connection or not (e.g. indicative of an indoor device), the presence of a 6 GHz WLAN Infrastructure if any (e.g., indicative of an indoor device when multiple devices are connected to a same AP), and may use this information to establish NAN operations in 6 GHz bands.

In one or more embodiments, when a NAN device has AFC capability, the NAN device may be referred to as an AFC device having access to an AFC system or to 6 GHz spectrum availability information (e.g., provided periodically to AFC devices) as authorized in a regulatory domain.

In one or more embodiments, NAN operations enabled in the 6 GHz frequency band as a result of satisfying device requirement in the 6 GHz frequency band include NAN Discovery, NAN Data Paths, and NAN ranging operations. Other peer-to-peer communications also may be enabled, such as Wi-Fi Aware communications, Wi-Fi Direct communications, and others. In addition, other frequency bands may have similar regulatory requirements based on device operating modes, so the present disclosure is not intended to be limited to only 6 GHz frequency band communications.

In one or more embodiments, a NAN Availability Attribute (e.g., as defined in the IEEE 802.11 standards) and included in NAN frames may be used to indicate which frequency bands and channels a NAN device may be available for NAN operations, and at which times.

In one or more embodiments, a NAN device operating in a 2.4 GHz or 5 GHz frequency band may use the 2.4 GHz and/or 5 GHz frequency bands to advertise AFC capability using NAN frames (e.g., a NAN Service Discovery Frame used in NAN Service Discovery operations as defined by the IEEE 802.11 standards). The NAN frames may advertise a NAN devices 6 GHz capability by including an indication in the Device Capability attribute of the frames. The NAN frames may advertise AFC capability by including an indication in the Device Capability attribute of the frames.

In one or more embodiments, when a NAN device is in the service area of a 6 GHz indoor low-power AP (e.g., by receiving the AP's enabling signal, such as with a beacon, probe response, etc.), the NAN device may be allowed to initiate a transmission to a peer NAN device. In this transmission, the NAN device may advertise/communicate the 6 GHz AP's MAC address and 6 GHz transmit power (or operating mode) information by including the 6 GHz WLAN infrastructure attribute (e.g., as defined by the IEEE 802.11 standards) in the NAN Service Discovery frames or NAN operation setup frames transmitted in 2.4 GHz/5 GHz bands.

In one or more embodiments, when advertising its NAN Availability attribute with 6 GHz information, a NAN device may indicate its maximum transmit power (or operating mode) or usage for the corresponding NAN availability. For example, the NAN device may indicate whether the NAN Availability is used for VLP, LPI, or (SP) AFC controlled. All advertised NAN Availability must be compliant with regulatory requirements.

In one or more embodiments, the NAN Availability attribute with 6 GHz information may be included in NAN action frames transmitted in 2.4 GHz/5 GHz bands for a NAN operation setup in 6 GHz bands. The NAN Availability attribute also may be included in NAN action frames transmitted in 6 GHz bands for a NAN operation schedule update.

In one or more embodiments, according to an advertised 6 GHz capability and NAN Availability associated with transmit power modes, two NAN devices may determine whether they may establish a NAN operation in the 6 GHz band and where (e.g., NAN availability) to establish a NAN operation in the 6 GHz band. Some example rules for establishing NAN operations in the 6 GHz band include: When two NAN devices want to establish a NAN operation in the Standard Power mode, at least one of NAN devices must be an AFC Device; two NAN devices operating in LPI modes may establish NAN operations when they are in the presence of an LPI AP's enabling signal and remain within the service area of the LPI AP, or at least one of devices is a subordinate device powered from a wired connection; two NAN devices operating in VLP modes may establish NAN operations indoor and outdoor when the regulatory domain allows.

In one or more embodiments, Table 1 below shows the Device Capability Attribute format used in NAN frames as defined by the IEEE 802.11 standards, and the changes to the Device Capability Attribute format used to indicate a NAN device's 6 GHz and AFC capabilities.

TABLE 1

Device Capability Attribute Format:

| Field | Size (octets) | Value | Description |
|---|---|---|---|
| Attribute ID | 1 | 0x0F | Identifies the type of NAN attribute. |
| Length | 2 | Variable | Length of the following fields in the attribute. |
| Map ID | 1 | Variable | b0: set to 1 to indicate the device capabilities only apply to the specified NAN Availability map. set to 0 to indicate the device capabilities apply to the device, when no NAN Availability map is included in the same frame or apply to all NAN Availability maps included in the same frame. b1-b4: indicate the NAN Availability map associated with the device capabilities; and reserved when b0 is set to 0. b5-b7: reserved |
| Committed DW Info | 2 | Variable | Refer to Table 10-50 of WFA Wi-Fi Aware Technical Specification |
| Supported Bands | 1 | Variable | Bitmap of Band IDs Bit 0: Reserved (for TV white spaces) Bit 1: Sub-1 GHz (excluding TV white spaces) Bit 2: 2.4 GHz Bit 3: Reserved (for 3.6 GHz) Bit 4: 4.9 and 5 GHz Bit 5: Reserved (for 60 GHz) [New] Bit 6: 6 GHz, set to 1 indicating support 6 GHz band. Otherwise, set to 0. Bit 7: Reserved |
| Operation Mode | 1 | Variable | See Table 10-51 of WFA Wi-Fi Aware Technical Specification |
| Number of Antennas | 1 | Variable | Bit 0-3: Number of TX antennas Value 0 indicates the information is not available. Bit 4-7: Number of RX antennas Value 0 indicates the information is not available. |

TABLE 1-continued

Device Capability Attribute Format:

| Field | Size (octets) | Value | Description |
|---|---|---|---|
| Max Channel Switch Time | 2 | Variable | Indicates max channel switch time in units of microseconds; Value 0 indicates the information is not available. Note: Max Channel Switch Time value should be the same across multiple Device Capability attributes included in a single frame. |
| Capabilities | 1 | Variable | Bit 0 (DFS Master): Set to 1 indicates that the device is a DFS master device. Otherwise, set to 0. Bit 1 (Extended Key ID): Set to 1 indicates that the device supports IEEE 802.11 extended key ID mechanism (refer to the WFA Wi-Fi Aware Technical Specification], otherwise, set to 0. If this bit is set to 0, the Key ID 0 shall be used. Bit 2 (Simultaneous NDP data reception): Set to 0 to indicate that the NAN Device does not support to receive the data packets of NDPs belonging to the same NDI pair in more than one channel within any committed FAW or ULW. The NAN Device's behavior when this bit is set to 1 is outside the scope of this specification. [New] Bit3: Set to 1 indicates that the device is an AFC Device. Otherwise, set to 0. Bit 4 to Bit 7: Reserved. |

As shown in Table 1 above, for a NAN device to indicate that it supports operations in a 6 GHz frequency band, the Supported Bands field may use the $7^{th}$ bit (e.g., of seven bits of the field) to indicate whether the device supports 6 GHz operations. To indicate that the device is an AFC device, the device may use the $4^{th}$ bit (e.g., of eight bits of the field). The new indications therefore may use existing, unused bits in the Device Capability Attribute of NAN frames to advertise 6 GHz and AFC capabilities.

In one or more embodiments, Table 2 below shows a 6 GHz WLAN Infrastructure Attribute format used in NAN frames as defined by the IEEE 802.11 standards, and the changes to the 6 GHz WLAN Infrastructure Attribute format used to indicate a NAN device's operating mode/transmit power.

TABLE 2

6 GHz WLAN Infrastructure Attribute Format:

| Field | Size (octets) | Value | Description |
|---|---|---|---|
| Attribute ID | 1 | 0xXX | Identifies the type of NAN attribute |
| Length | 2 | Variable | Length of the following fields in the attribute. |
| BSSID | 6 | Variable | BSSID of the 6 GHz AP in the area. |
| MAC Address | 6 | Variable | Device's infrastructure interface address |
| [New] AP Transmit Power Mode | 1 | Variable | 0: unknown 1: Standard Power AFC 2. Low Power Indoor (LPI) 3: Very Low Power (VLP) |
| Device Role | | | Identifies the Device role in the WLAN Infrastructure: 0 means AP; 1 means non-AP STA associated with the AP; 2 means non-AP STA and it is listening to the AP, but not associated with the AP |

TABLE 2-continued

6 GHz WLAN Infrastructure Attribute Format:

| Field | Size (octets) | Value | Description |
|---|---|---|---|
| WLAN Operating class | 1 | Variable | See Annex E in IEEE 802.11-2016, Table E-4 for detail |
| WLAN Channel | 1 | Variable | Primary 20 MHz channel. Note that primary channel uniquely determines the frequency range for 80 MHz, 160 MHz and the first segment of 80 + 80 MHz channels. |
| WLAN Channel Center Frequency | 1 | Variable | For 80 + 80 MHz channels only, indicates the channel center frequency index of the second segment. Set to 0 otherwise. |
| WLAN Beacon TBTT offset | 2 | Variable | The difference in TUs between last NAN DW0 where the 26 LSB bits of NAN TSF were 0 and the NAN TSF of any Non-NAN Beacon that was transmitted after the referred DW0. Set to 0 if the Beacon information is not available. |
| WLAN Beacon Interval | 2 | Variable | The number of TUs between TBTTs. Set to 0 if the Beacon information is not available. |

As shown in Table 2 above, the 6 GHz WLAN Infrastructure Attribute of NAN frames may be modified by adding a new AP Transmit Power Mode field that may indicate whether a device's operating mode is unknown, SP AFC, LPI, or VLP.

In one or more embodiments, Table 3 below shows an Entry Control Field format that may be used in NAN frames as defined by the IEEE 802.11 standards (e.g., part of an Available Entry element of a NAN Availability attribute), and the modifications to the format that may be used to indicate 6 GHz compliance.

TABLE 3

Entry Control Field Format:

| Number of Bit(s) | Information | Notes |
|---|---|---|
| 0-2 | Availability Type | b0: 1, Committed; 0, otherwise; b1: 1, Potential; 0, otherwise. b2: 1, Conditional; 0, otherwise. 000, 101, and 111 are reserved. Note - At least one of the three bits is set to 1 to be meaningful. |
| 3-4 | Usage Preference | An integer ranging from 0 to 3, which represents the preference of being available in the associated FAWs. The preference is higher when the value is set larger. Note: It does not apply to Committed or Conditional FAWs. |
| 5-7 | Utilization | Values 0-5 indicating proportion within the associated FAWs that are already utilized for other purposes quantized to 20%. Value 6 is reserved. Value 7 indicates unknown utilization. |
| 8-11 | Rx Nss | Indicate the max number of spatial streams the NAN Device can receive during the associated FAWs. |
| 12 | Time Bitmap Present | 1: Time Bitmap Control, Time Bitmap Length, and Time Bitmap fields are present 0: Time Bitmap Control, Time Bitmap Length, and Time Bitmap are NOT present, and all NAN Slots are available |
| [New] 13-14 | 6 GHz Compliant | Set to 00 (value 0) if indication in the availability entry is compliant with 6 GHz Very Low Power (VLP) use. Set to 01 (value 1) if indication in the availability entry is compliant with 6 GHz Low Power Indoor (LPI). use. Set to 10 (value 2) if indication in the availability entry is compliant with 6 GHz Low Power Indoor (LPI) use and the device is supplied power from a wired connection. Set to 11 (value 3) if indication in the availability entry is compliant with 6 GHz Standard Power AFC controlled use. |
| 15 | Reserved | Reserved for future use |

As shown above in Table 3, bits 13 and 14 of the Entry Control Field may be used to indicate 6 GHz compliance. In particular, bits 13 and 14 may be use to indicate whether an availability entry (e.g., a frequency band and time) of a device is compliant with 6 GHz VLP use, whether the availability entry of the device is compliant with 6 GHz LPI use, whether the availability entry of the device is compliant with 6 GHz LPI use and whether power is supplied from a wired connection, and/or whether the availability entry of the device is compliant with 6 GHz SP AFC use.

It is important to recognize the limited size and format of frames defined by the IEEE 802.11 technical standards. Frames defined by the IEEE 802.11 technical standards are specific frame types that, to add information without compromising the form and meaning of the frames, may require the definition of unused (e.g., reserved) bits and/or variable length fields. For example, adding a bit to a defined frame may render the defined frame a different type of frame, as the device that receives the frame may decode the frame and determine its contents based on the frame type. In this manner, adding information to existing types of defined frames may require using existing bits of the frames to communicate information that is not currently communicated in the defined frames.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1A is a network diagram illustrating an example network environment, according to some example embodiments of the present disclosure. Wireless network 100 may include one or more user devices 120 (e.g., 122, 124, 126, or 128), which may communicate in accordance with wireless standards, such as the IEEE 802.11 communication standards. The user device(s) 120 may be mobile devices that are non-stationary (e.g., not having fixed locations) or may be stationary devices.

Figure 5:
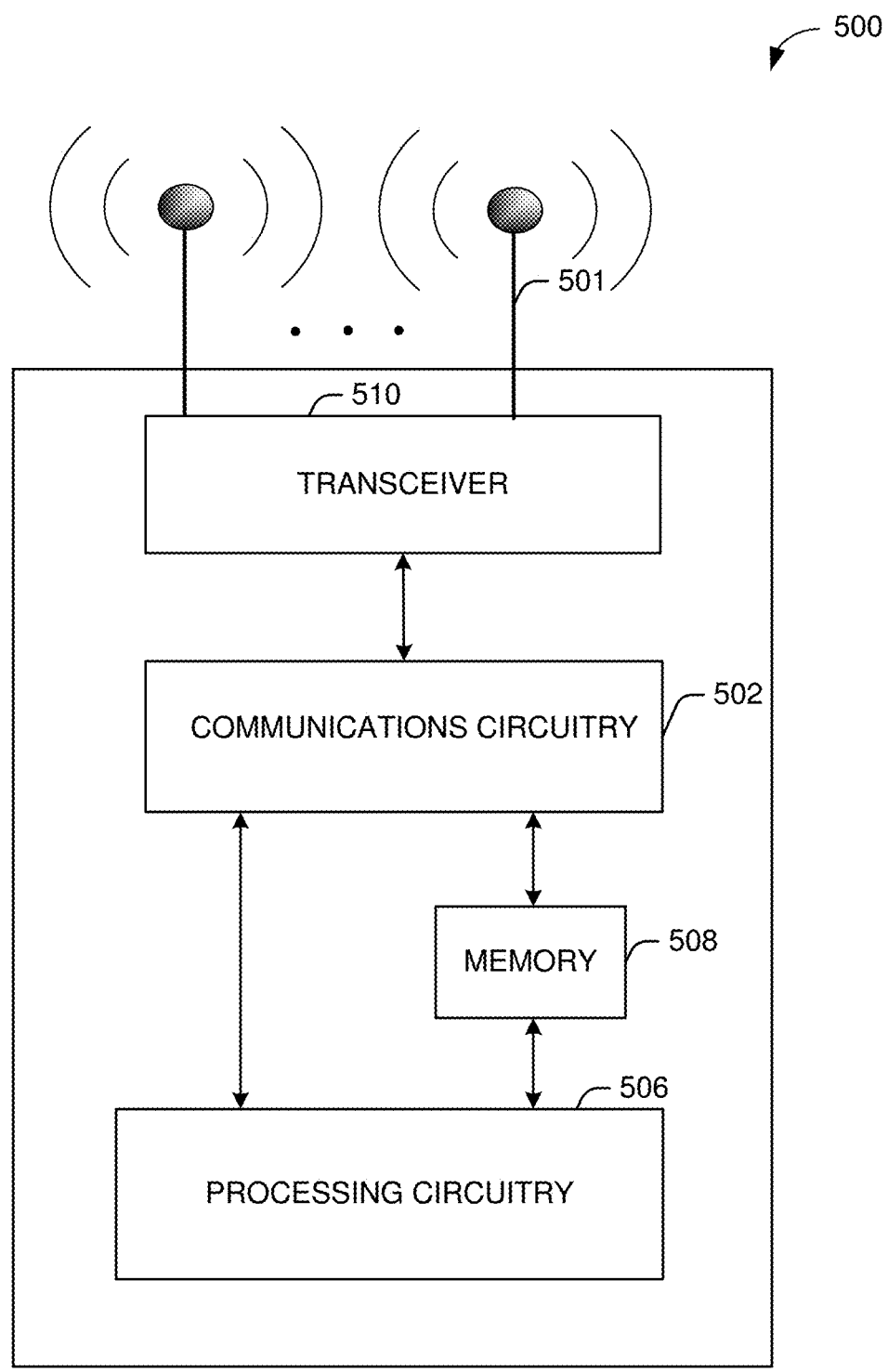
FIG. 5 illustrates a functional diagram of an exemplary communication station that may be suitable for use as a user device, in accordance with one or more example embodiments of the present disclosure.
Figure 6:
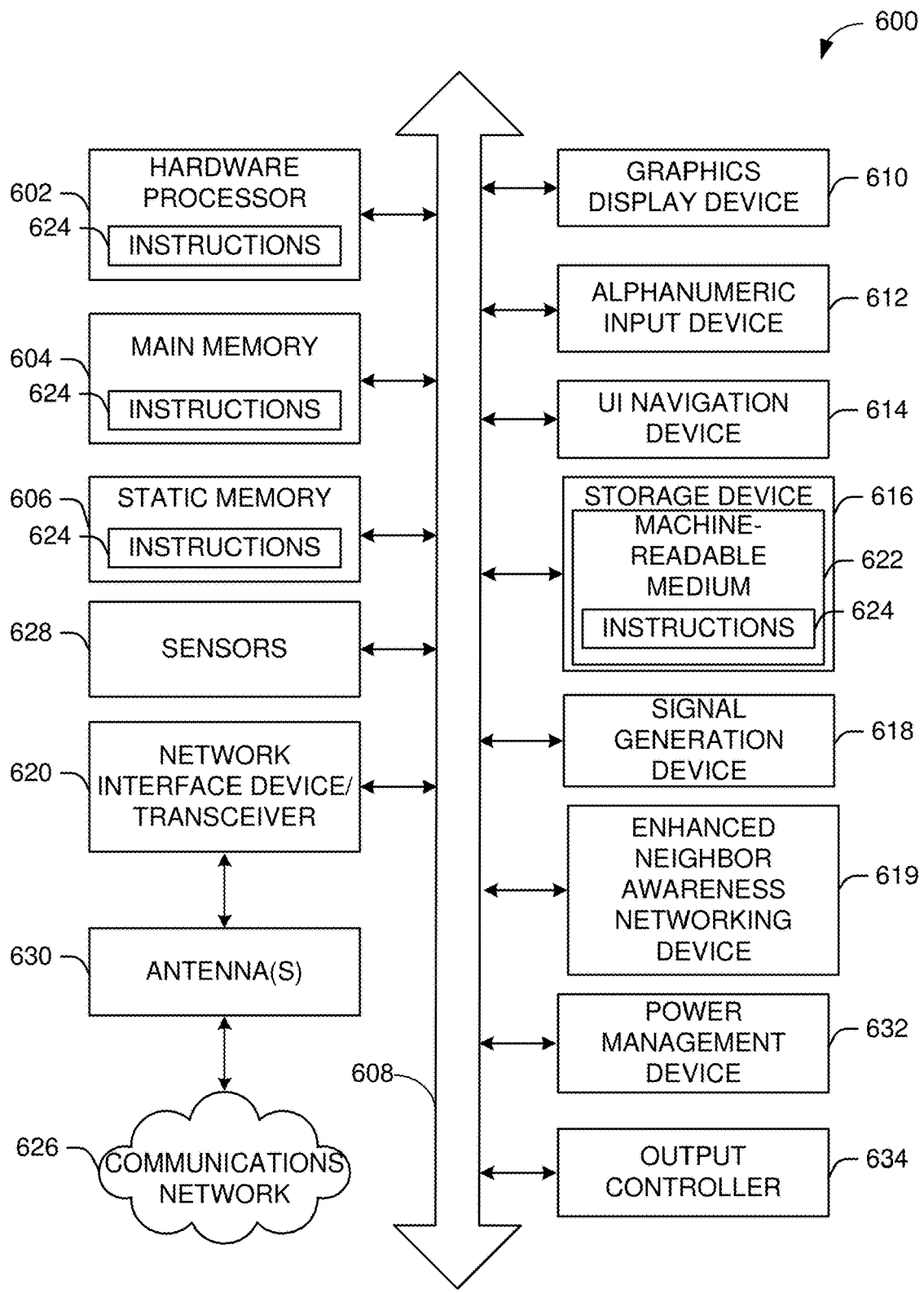
FIG. 6 illustrates a block diagram of an example machine upon which any of one or more techniques (e.g., methods) may be performed, in accordance with one or more example embodiments of the present disclosure.

In some embodiments, the user devices 120 may include one or more computer systems similar to that of the functional diagram of FIG. 5 and/or the example machine/system of FIG. 6.

One or more illustrative user device(s) 120 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 may operate as a personal basic service set (PBSS) control point/access point (PCP/AP). The user device(s) 120 (e.g., 122, XX24, 126, or 128) may include any suitable processor-driven device including, but not limited to, a mobile device or a non-mobile, e.g., a static device. For example, user device(s) 120 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 may also include mesh stations in, for example, a mesh network, in accordance with one or more IEEE 802.11 standards and/or 3GPP standards.

Any of the user device(s) 10 (e.g., user devices 122, 124, 126, 128) may be configured to communicate with each other and/or the AP 102 via one or more communications networks 130 and 135 wirelessly or wired. The user device(s) 120 may also communicate peer-to-peer or directly with each other with or without an access point (AP). Any of the communications networks 130 and 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 122, 124, 126, 128) may include one or more communications antennas. The one or more communications antennas may be any suitable type of antennas corresponding to the communications protocols used by the user device(s) 120 (e.g., user devices 122, 124, 126, 128). Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120.

Any of the user device(s) 120 (e.g., user devices 124, 126, 128), may be configured to perform directional transmission and/or directional reception in conjunction with wirelessly communicating in a wireless network. Any of the user device(s) 120 (e.g., user devices 124, 126, 128) may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128) may be configured to perform any given directional transmission towards one or more defined transmit sectors. Any of the user device(s) 120 (e.g., user devices 124, 126, 128), may be configured to perform any given directional reception from one or more defined receive sectors.

MIMO beamforming in a wireless network may be accomplished using RF beamforming and/or digital beamforming. In some embodiments, in performing a given MIMO transmission, user devices 120 may be configured to use all or a subset of its one or more communications antennas to perform MIMO beamforming.

Any of the user devices 120 (e.g., user devices 122, 124, 126, 128) may include any suitable radio and/or transceiver for transmitting and/or receiving radio frequency (RF) signals in the bandwidth and/or channels corresponding to the communications protocols utilized by any of the user device(s) 120 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), 6 GHz channels, or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1A, two of the user devices 120 may send NAN frames 142 to communicate to one another their capabilities in different frequency bands, such as 6 GHz capabilities, whether the sending device is an AFC device, when a device may be available in a 6 GHz frequency band, transmit power/operating mode, and other information (e.g., as shown in Tables 1-3). Any frame of the NAN frames 142 may include one or more of the attributes/fields shown in Tables 1-3. Any of the user devices 120 may be connected, wirelessly or wired, to the AP 102, which may send frames 144 (e.g., enabling signals such as beacons, probes, etc.) to the user devices 120, which may be used by the user devices 120 to indicate whether any of the user devices 120 are indoor devices. Once two of the user devices 120 determine, based on the NAN frames 142, that 6 GHz requirements are satisfied by the two devices, the two devices may establish a NAN connection for NAN operations.

It is understood that the above descriptions are for purposes of illustration and are not meant to be limiting.

Figure 1B:
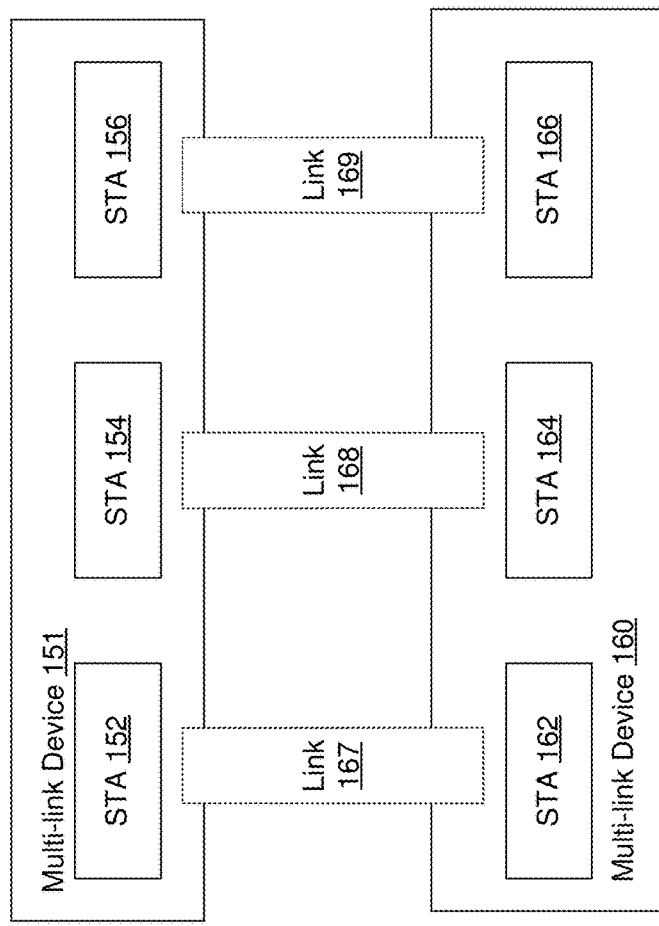
FIG. 1B depicts an illustrative schematic diagram for multi-link device (MLD) communications between two logical entities, in accordance with one or more example embodiments of the present disclosure.

FIG. 1B depicts an illustrative schematic diagram 150 for MLD communications between two logical entities, in accordance with one or more example embodiments of the present disclosure.

Referring to FIG. 1B, there are shown two MLDs in communication with each other. MLD 151 may include multiple STAs (e.g., STA 152, STA 154, STA 156, etc.), and MLD 160 may include multiple STAs (e.g., STA 162, STA 164, STA 166, etc.). The STAs of the MLD 151 and the STAs of the MLD 160 may set up links with each other (e.g., link 167 for a first frequency band used by the STA 152 and the STA 162, link 168 for a second frequency band used by the STA 154 and the STA 164, link 169 for a second frequency band used by the STA 156 and the STA 166). In this example of FIG. 1B, the two MLDs may be two separate physical devices, where each one comprises a number of virtual or logical devices (e.g., the STAs).

Figure 1C:
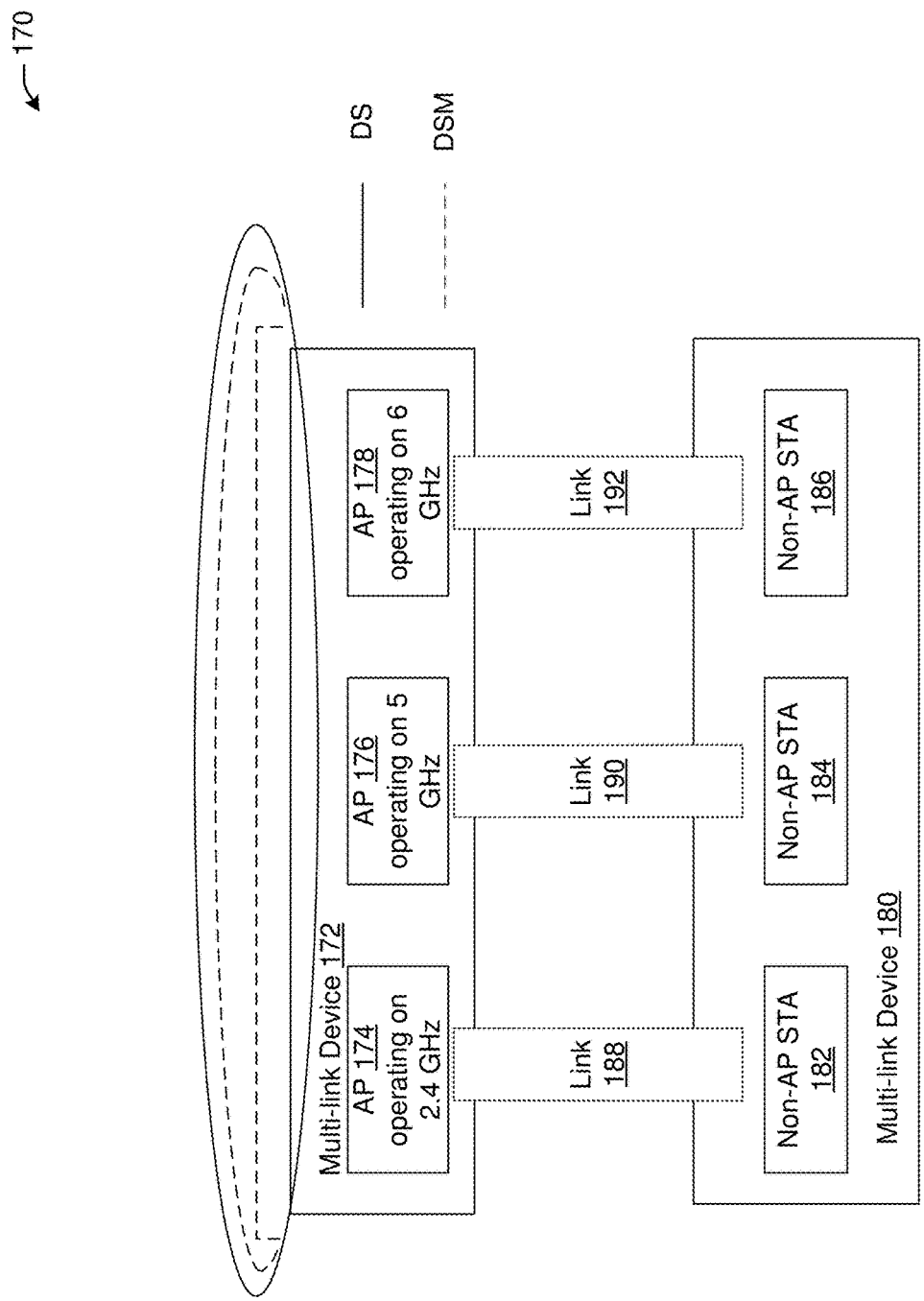
FIG. 1C depicts an illustrative schematic diagram for MLD communications between an access point (AP) MLD with logical entities and a non-AP MLD with logical entities, in accordance with one or more example embodiments of the present disclosure.

FIG. 1C depicts an illustrative schematic diagram 170 for MLD communications between an AP MLD with logical entities and a non-AP MLD with logical entities, in accordance with one or more example embodiments of the present disclosure.

Referring to FIG. 1C, there are shown two MLDs on either side, each which includes multiple STAs that can set up links with each other. For infrastructure framework, MLD 172 may be an A-MLD with logical APs (e.g., AP 174, AP 176, and AP 178) on one side, and MLD 180 may be a non-AP MLD including non-AP logical entities (non-AP STA 182, non-AP STA 184, and non-AP STA 186) on the other side. The detailed definition is shown below. It should be noted that the term MLLE and MLD are interchangeable and indicate the same type of entity. Throughout this disclosure, MLLE may be used but anywhere the MLLE term is used, it can be replaced with MLD. Multi-link non-AP logical entity (non-AP MLLE, also can be referred to as non-AP MLD): A multi-link logical entity, where each STA within the multi-link logical entity is a non-AP EHT STA. It should be noted that this framework is a natural extension from the one link operation between two STAs, which are AP and non-AP STA under the infrastructure framework (e.g., when an AP is used as a medium for communication between STAs).

In the example of FIG. 1C, the MLD 172 and the MLD 180 may be two separate physical devices, where each one comprises a number of virtual or logical devices. For example, the multi-link AP logical entity may comprise three APs, AP 174 operating on 2.4 GHz (e.g., link 188), AP 176 operating on 5 GHz (e.g., link 190), and AP 178 operating on 6 GHz (e.g., link 192). Further, the multi-link non-AP logical entity may comprise three non-AP STAs, non-AP STA 182 communicating with AP 174 on link 188, non-AP STA 184 communicating with AP 176 on link 190, and non-AP STA 186 communicating with AP 178 on link 192.

The MLD 172 is shown in FIG. 1C to have access to a distribution system (DS), which is a system used to interconnect a set of BSSs to create an extended service set (ESS). The MLD 172 is also shown in FIG. 1C to have access a distribution system medium (DSM), which is the medium used by a DS for BSS interconnections. Simply put, DS and DSM allow the AP to communicate with different BSSs.

It should be understood that although the example shows three logical entities within the MLD 172 and the three logical entities within the MLD 180, this is merely for illustration purposes and that other numbers of logical entities with each of the MLDs may be envisioned.

It is understood that the above descriptions are for purposes of illustration and are not meant to be limiting.

Figure 2:
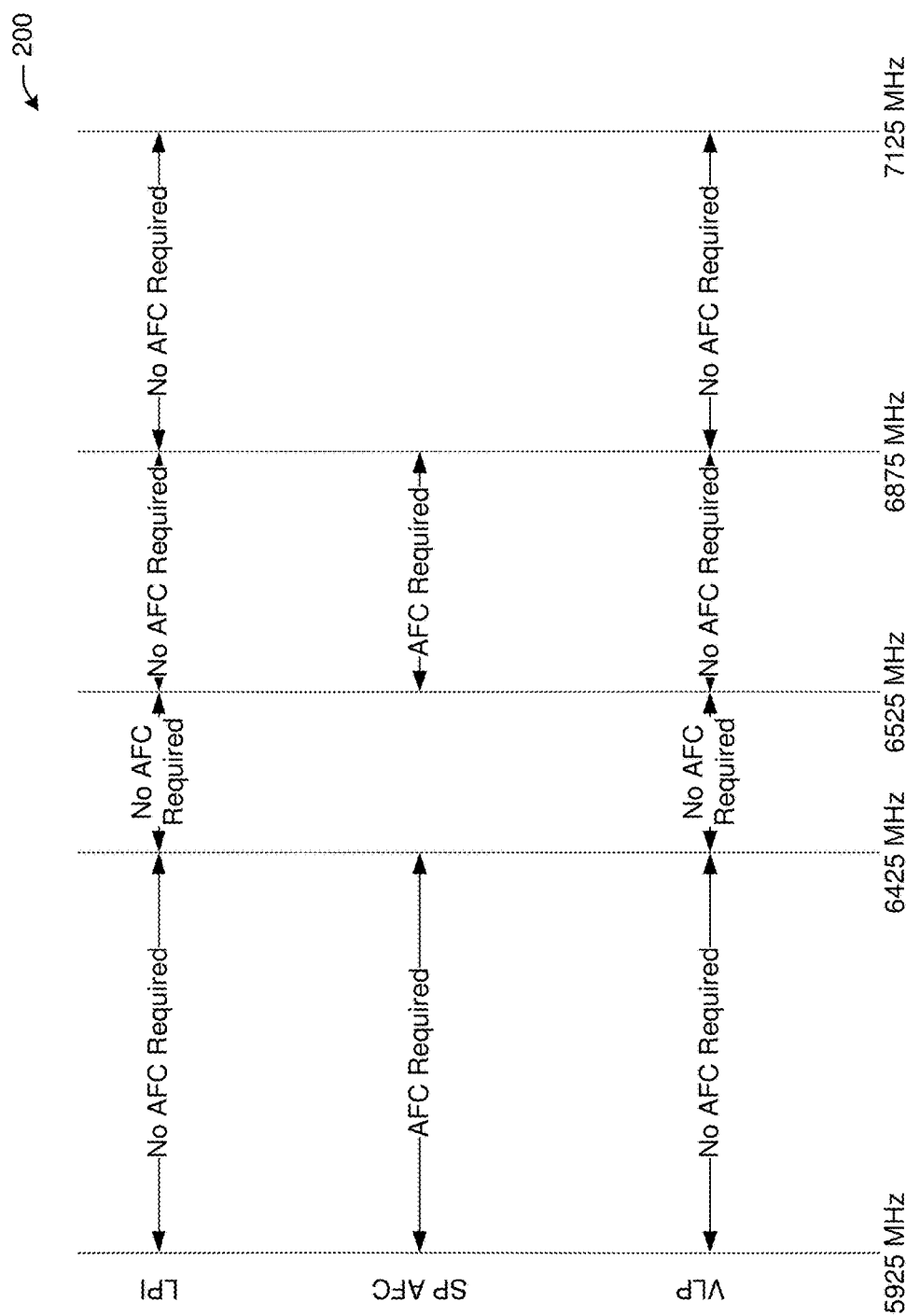
FIG. 2 depicts an illustrative schematic diagram for wireless communications in a 6 GHz frequency band, in accordance with one or more example embodiments of the present disclosure.

FIG. 2 depicts an illustrative schematic diagram 200 for wireless communications in a 6 GHz frequency band, in accordance with one or more example embodiments of the present disclosure.

Referring to FIG. 2, there are shown three operating modes in 6 GHz. The operating modes shown are: SP, LPI, and VLP. SP devices are allowed in 850 MHz of spectrum (UNII-5 and UNII-7), but AFC is required for Indoor and outdoor Wi-Fi. LPI devices are allowed in the entire 1200 MHz of 6 GHz spectrum for Indoor Wi-Fi without using AFC. VLP devices are allowed in the 6 GHz band for Indoor and Outdoor Wi-Fi without using AFC. Thus, for two NAN devices (e.g., two of the user devices 120 of FIG. 1A) to establish a NAN connection and perform NAN operations in the 6 GHz frequency band, the two NAN devices may exchange information (e.g., using another frequency band, such as 2.4 GHz or 5 GHz) by sending NAN frames (e.g., the NAN frames 142 of FIG. 1A), and may determine whether the transmit power/operating mode and/or AFC capabilities are satisfied. For example, two NAN devices may determine that each have 6 GHz capabilities during a same time window, that the devices are SP, VLP, or LPI, and whether AFC requirements are met when the devices are SP.

It is understood that the above descriptions are for purposes of illustration and are not meant to be limiting.

Figure 3:
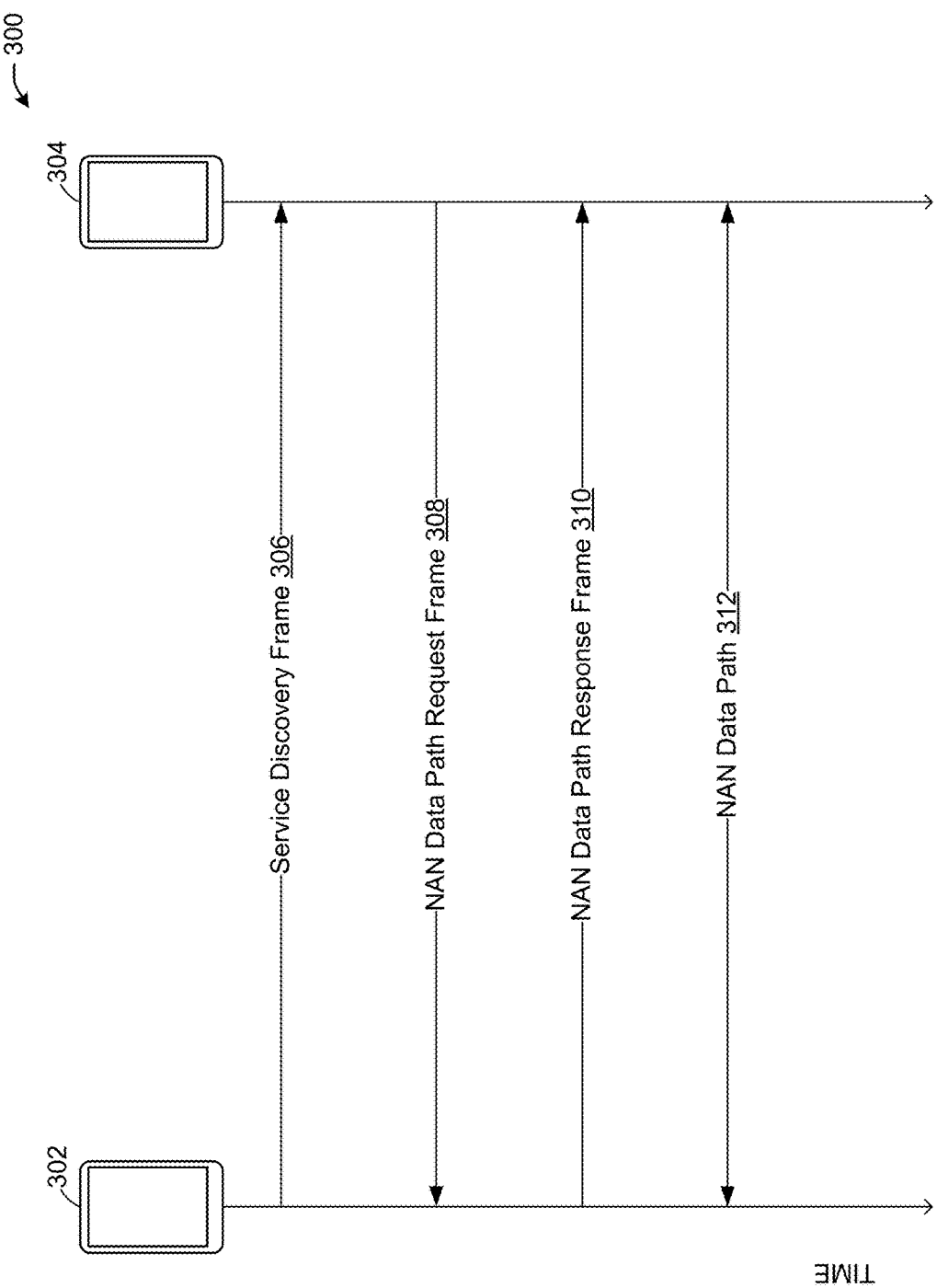
FIG. 3 depicts an illustrative schematic diagram for neighbor awareness networking (NAN) communications, in accordance with one or more example embodiments of the present disclosure.

FIG. 3 depicts an illustrative schematic diagram 300 for NAN communications, in accordance with one or more example embodiments of the present disclosure.

Referring to FIG. 3, a responder NAN device 302 may send to an initiator NAN device 304 a NAN Service Discovery Frame 306 (e.g., the NAN frames 142 of FIG. 1A). The NAN Service Discovery Frame 306 may include an indication of whether the responder NAN device 302 supports 6 GHz operations, whether the responder NAN device 302 is an AFC device, NAN availability information (e.g., in one or more frequency bands indicated by the NAN Service Discovery Frame 306), operation mode/transmit power, and the like (e.g., using one of the frame formats described above). The initiator NAN device 304 may receive the NAN Service Discovery Frame 306 and may send a NAN Data Path Request frame 308 to the responder NAN device 302, the NAN Data Path Request frame 308 include an indication of whether the initiator NAN device 304 supports 6 GHz operations, whether the initiator NAN device 304 is an AFC device, NAN availability information (e.g., in one or more frequency bands indicated by the NAN Data Path Request frame 308), operation mode/transmit power, and the like (e.g., using one of the frame formats described above). The responder NAN device 302 may receive the NAN Data Path Request frame 308 and may send a NAN Data Path Response frame 310 to the initiator NAN device 304, the NAN Data Path Response frame 310 including an indication of NAN availability in one or more frequency bands, including in the 6 GHz frequency band. The frames shown in FIG. 3 may be sent in a different frequency band (e.g., 2.4 or 5 GHz) than the 6 GHz frequency band. When the devices determine that the requirements of a 6 GHz frequency band or another frequency band have been satisfied, the devices may establish a NAN Data Path 312 for the performance of NAN operations, such as NAN Discovery, NAN Data Path, and NAN Ranging operations as defined by the IEEE 802.11 standards. Any of the NAN frames shown in FIG. 3 may include the attributes/fields shown in Tables 1-3 to indicate 6 GHz capabilities and availability, AFC capabilities, transmit power operating mode, and other information as shown in Tables 1-3.

It is understood that the above descriptions are for purposes of illustration and are not meant to be limiting.

Figure 4:
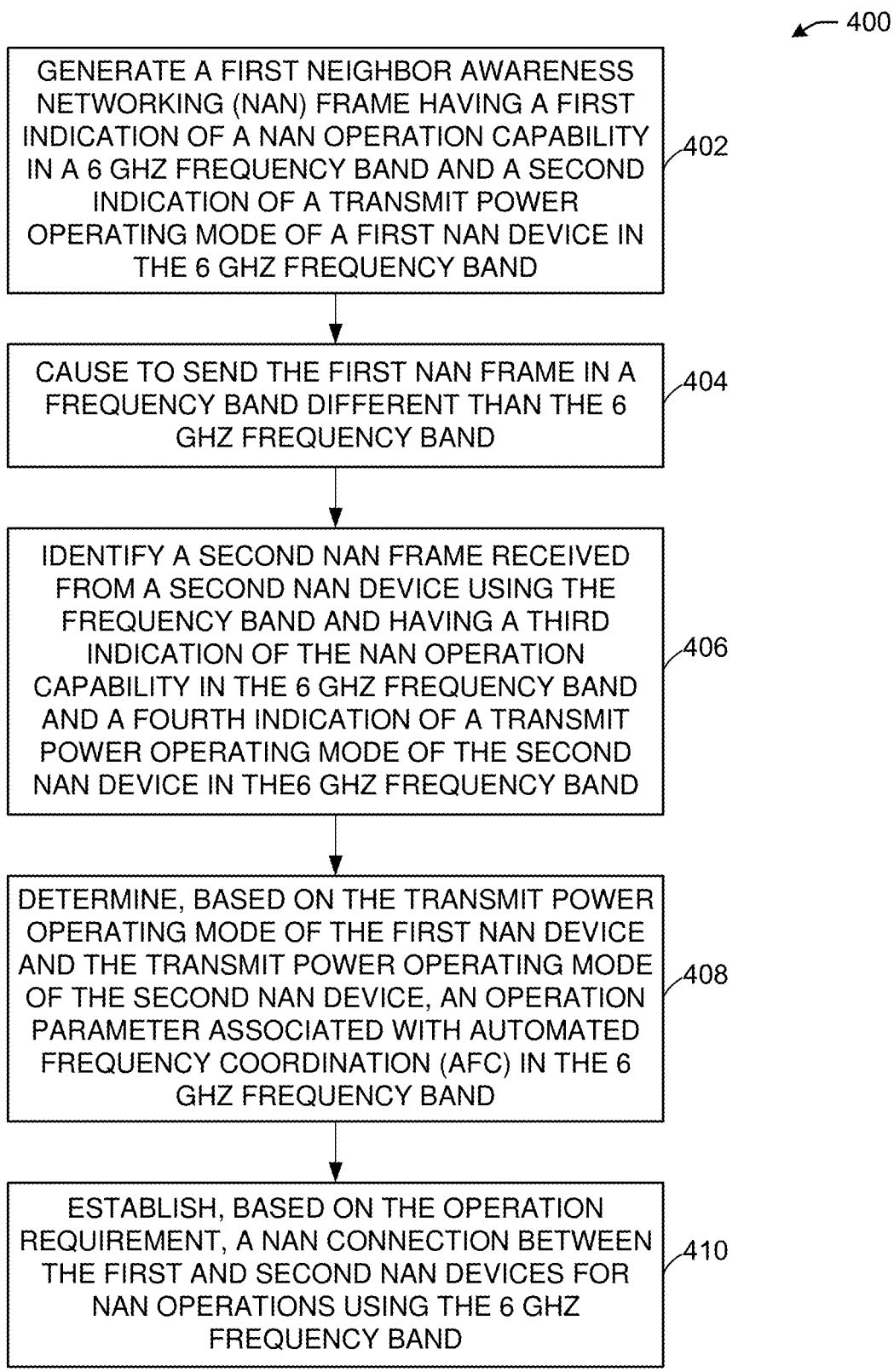
FIG. 4 illustrates a flow diagram of illustrative process for illustrative NAN data path operations, in accordance with one or more example embodiments of the present disclosure.

FIG. 4 illustrates a flow diagram of illustrative process 400 for illustrative NAN data path operations, in accordance with one or more example embodiments of the present disclosure.

At block 402, a NAN device (e.g., the user device 122 of FIG. 1A or any of the user devices 120 of FIG. 1A) may generate a first NAN frame (e.g., the NAN frames 142 of FIG. 1A, the NAN Service Discovery Frame 306 of FIG. 3, the NAN Data Path Request frame of FIG. 3) to a second NAN device (e.g., the user device 120 of FIG. 1A, the user device 124 of FIG. 1A or any of the user devices 120 of FIG. 1A). The first NAN frame may include any attributes/fields as shown in Tables 1-3, such as a first indication of the first NAN device's operation capability in a 6 GHz frequency band (e.g., as shown in FIG. 2). The first indication may be included in a Capabilities field of a Device Capability Attribute in the first NAN frame (e.g., as shown in Table 1), a 6 GHz WLAN Infrastructure Attribute in the first NAN frame (e.g., as shown in Table 2), or in an Entry Control field of the first NAN frame (e.g., as shown in Table 3). The first NAN frame also may include a second indication of a transmit power operating mode of the first NAN device in the 6 GHz frequency band. The second indication may be included in a Capabilities field of a Device Capability Attribute in the first NAN frame (e.g., as shown in Table 1), a 6 GHz WLAN Infrastructure Attribute in the first NAN frame (e.g., as shown in Table 2), or in an Entry Control field of the first NAN frame (e.g., as shown in Table 3). For example, an indication that the first NAN device is VLP, LPI, or SP may correspond to a transmit power in the 6 GHz frequency band. In addition, the first NAN frame may include an indication of whether the first NAN device has AFC capabilities (e.g., connects to a server or database to receive AFC information for the 6 GHz frequency band). Whether the first NAN device or the second NAN device needs AFC capabilities to operate in the 6 GHz frequency band may depend on the transmit power operating mode of the NAN devices.

At block 404, the first NAN device may cause to send the first NAN frame in a frequency band other than the 6 GHz frequency band. For example, the first NAN device and the second NAN device may be operating in a 2.4 GHz or 5 GHz frequency band, and may use the 2.4 GHz or 5 GHz frequency band to advertise 6 GHz capabilities before determining whether the NAN devices may establish NAN connections and operations in the 6 GHz frequency band (e.g., due to device operation parameters, such as regulatory requirements that may not apply to the 2.4 GHz or 5 GHz frequency band). Alternatively, the first NAN frame may include an operation schedule update for the 6 GHz frequency band when the first and second NAN devices already have established a NAN connection in the 6 GHz frequency band. In both situations, the first and second NAN devices must provide each other their 6 GHz capabilities and transmit power operating modes (e.g., using a non-6 GHz frequency band) to determine, before establishing NAN operations as unlicensed devices in the 6 GHz frequency band, whether the devices satisfy the operating requirements of the 6 GHz frequency band.

At block 406, the first NAN device may identify a second NAN frame using the non-6 GHz frequency band from the second NAN device. The second NAN device, in response to receiving the first NAN frame, may identify the first NAN device's 6 GHz capabilities based on the first indication in the first NAN frame. Upon identifying the first NAN device's 6 GHz capabilities, the second NAN device may generate the second NAN frame to include a third indication that the second NAN device also has the 6 GHz capabilities (e.g., using the Device Capability Attribute in the first NAN frame as shown in Table 1, a 6 GHz WLAN Infrastructure Attribute in the first NAN frame as shown in Table 2, or an Entry Control field of the first NAN frame as shown in Table 3). The second NAN device also may include a fourth indication in the second NAN frame to indicate the second NAN device's transmit power operating mode in the 6 GHz frequency band (e.g., in a Capabilities field of a Device Capability Attribute in the first NAN frame as shown in Table 1, a 6 GHz WLAN Infrastructure Attribute in the first NAN frame as shown in Table 2, or in an Entry Control field of the first NAN frame as shown in Table 3). The second NAN frame also may include an indication of whether the second NAN device has AFC capabilities (e.g., connects to a server or database to receive AFC information for the 6 GHz frequency band).

At block 408, the first NAN device may determine, based on the 6 GHz capabilities (e.g., the first and third indications) and the transmit power operating modes of the first and second NAN devices (e.g., the second and fourth indications) an operation parameter for the 6 GHz frequency band. In particular, the operation parameter may be that at least one of the NAN devices includes AFC capabilities (e.g., when the devices' transmit power operating modes are SP), or may not require that either NAN device has AFC capabilities (e.g., when the devices' transmit power operating modes are LPI or VLP). When both NAN devices have 6 GHz capabilities, the first and second NAN device may determine each other's transmit power operating modes.

At block 410, the first NAN device may establish, based on the operation parameter, a NAN connection between each other using the 6 GHz frequency band for NAN operations (e.g., the NAN Data Path 312 of FIG. 3). When a device is an SP device, the NAN devices may determine that at least one of the two devices must have AFC capabilities. When neither SP device has AFC capabilities, the devices may not be able to establish a NAN connection in the 6 GHz frequency band. When at least one of the SP devices has AFC capabilities, the devices may establish a NAN connection in the 6 GHz frequency band (e.g., using procedures defined in the IEEE 802.11 standards). When the devices are LPI or VLP, the devices may determine that no AFC capabilities are required, and may establish a NAN connection in the 6 GHz frequency band frequency band (e.g., using procedures defined in the IEEE 802.11 standards).

It is understood that the above descriptions are for purposes of illustration and are not meant to be limiting.

FIG. 5 shows a functional diagram of an exemplary communication station 500, in accordance with one or more example embodiments of the present disclosure. In one embodiment, FIG. 5 illustrates a functional block diagram of a communication station that may be suitable for use as a user device 120 (FIG. XX) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), an enhanced NAN device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the enhanced NAN device 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The enhanced NAN device 619 may carry out or perform any of the operations and processes (e.g., process XY00) described and shown above.

It is understood that the above are only a subset of what the enhanced NAN device 619 may be configured to perform and that other functions included throughout this disclosure may also be performed by the enhanced NAN device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
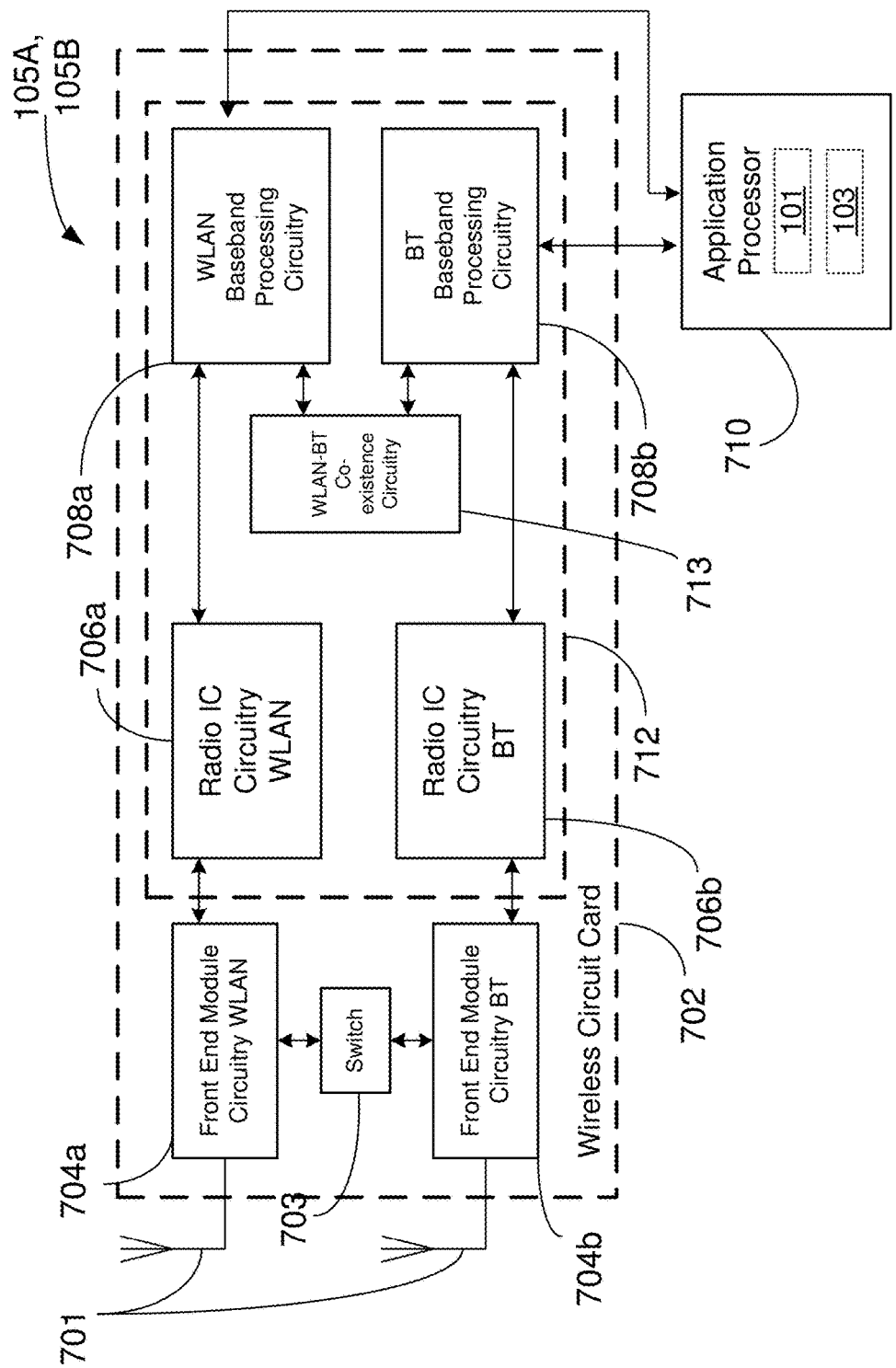
FIG. 7 is a block diagram of a radio architecture in accordance with some examples.

FIG. 7 is a block diagram of a radio architecture 105A, 105B in accordance with some embodiments that may be implemented in any one of the example AP 102 and/or the example STA 120 of FIG. 1A. Radio architecture 105A, 105B may include radio front-end module (FEM) circuitry 704a-b, radio IC circuitry 706a-b and baseband processing circuitry 708a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 704a-b may include a WLAN or Wi-Fi FEM circuitry 704a and a Bluetooth (BT) FEM circuitry 704b. The WLAN FEM circuitry 704a may include a receive signal path comprising circuitry configured to operate on WLAN RF signals received from one or more antennas 701, to amplify the received signals and to provide the amplified versions of the received signals to the WLAN radio IC circuitry 706a for further processing. The BT FEM circuitry 704b may include a receive signal path which may include circuitry configured to operate on BT RF signals received from one or more antennas 701, to amplify the received signals and to provide the amplified versions of the received signals to the BT radio IC circuitry 706b for further processing. FEM circuitry 704a may also include a transmit signal path which may include circuitry configured to amplify WLAN signals provided by the radio IC circuitry 706a for wireless transmission by one or more of the antennas 701. In addition, FEM circuitry 704b may also include a transmit signal path which may include circuitry configured to amplify BT signals provided by the radio IC circuitry 706b for wireless transmission by the one or more antennas. In the embodiment of FIG. 7, although FEM 704a and FEM 704b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 706a-b as shown may include WLAN radio IC circuitry 706a and BT radio IC circuitry 706b. The WLAN radio IC circuitry 706a may include a receive signal path which may include circuitry to down-convert WLAN RF signals received from the FEM circuitry 704a and provide baseband signals to WLAN baseband processing circuitry 708a. BT radio IC circuitry 706b may in turn include a receive signal path which may include circuitry to down-convert BT RF signals received from the FEM circuitry 704b and provide baseband signals to BT baseband processing circuitry 708b. WLAN radio IC circuitry 706a may also include a transmit signal path which may include circuitry to up-convert WLAN baseband signals provided by the WLAN baseband processing circuitry 708a and provide WLAN RF output signals to the FEM circuitry 704a for subsequent wireless transmission by the one or more antennas 701. BT radio IC circuitry 706b may also include a transmit signal path which may include circuitry to up-convert BT baseband signals provided by the BT baseband processing circuitry 708b and provide BT RF output signals to the FEM circuitry 704b for subsequent wireless transmission by the one or more antennas 701. In the embodiment of FIG. 7, although radio IC circuitries 706a and 706b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 708a-b may include a WLAN baseband processing circuitry 708a and a BT baseband processing circuitry 708b. The WLAN baseband processing circuitry 708a may include a memory, such as, for example, a set of RAM arrays in a Fast Fourier Transform or Inverse Fast Fourier Transform block (not shown) of the WLAN baseband processing circuitry 708a. Each of the WLAN baseband circuitry 708a and the BT baseband circuitry 708b may further include one or more processors and control logic to process the signals received from the corresponding WLAN or BT receive signal path of the radio IC circuitry 706a-b, and to also generate corresponding WLAN or BT baseband signals for the transmit signal path of the radio IC circuitry 706a-b. Each of the baseband processing circuitries 708a and 708b may further include physical layer (PHY) and medium access control layer (MAC) circuitry, and may further interface with a device for generation and processing of the baseband signals and for controlling operations of the radio IC circuitry 706a-b.

Referring still to FIG. 7, according to the shown embodiment, WLAN-BT coexistence circuitry 713 may include logic providing an interface between the WLAN baseband circuitry 708a and the BT baseband circuitry 708b to enable use cases requiring WLAN and BT coexistence. In addition, a switch 703 may be provided between the WLAN FEM circuitry 704a and the BT FEM circuitry 704b to allow switching between the WLAN and BT radios according to application needs. In addition, although the antennas 701 are depicted as being respectively connected to the WLAN FEM circuitry 704a and the BT FEM circuitry 704b, embodiments include within their scope the sharing of one or more antennas as between the WLAN and BT FEMs, or the provision of more than one antenna connected to each of FEM 704a or 704b.

In some embodiments, the front-end module circuitry 704a-b, the radio IC circuitry 706a-b, and baseband processing circuitry 708a-b may be provided on a single radio card, such as wireless radio card 702. In some other embodiments, the one or more antennas 701, the FEM circuitry 704a-b and the radio IC circuitry 706a-b may be provided on a single radio card. In some other embodiments, the radio IC circuitry 706a-b and the baseband processing circuitry 708a-b may be provided on a single chip or integrated circuit (IC), such as IC 712.

In some embodiments, the wireless radio card 702 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 708b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 8:
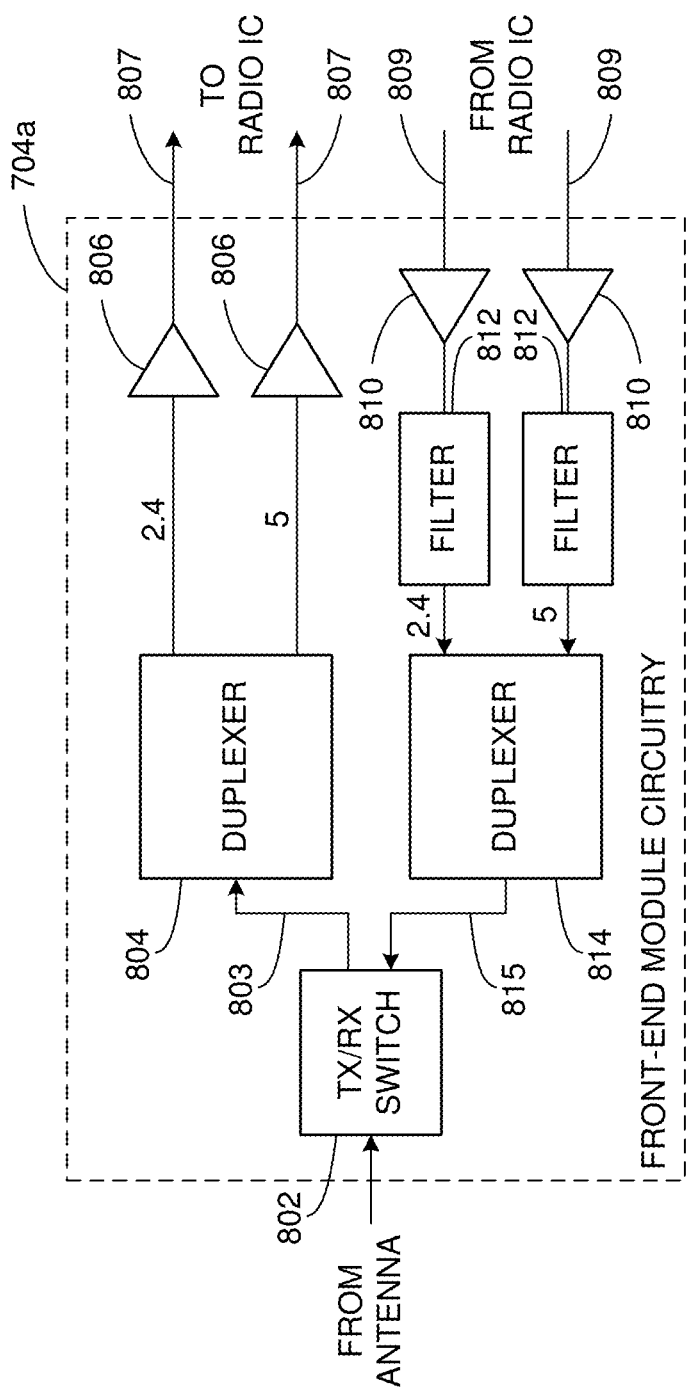
FIG. 8 illustrates an example front-end module circuitry for use in the radio architecture of FIG. 7, in accordance with one or more example embodiments of the present disclosure.

FIG. 8 illustrates WLAN FEM circuitry 704a in accordance with some embodiments. Although the example of FIG. 8 is described in conjunction with the WLAN FEM circuitry 704a, the example of FIG. 8 may be described in conjunction with the example BT FEM circuitry 704b (FIG. 7), although other circuitry configurations may also be suitable.

In some embodiments, the FEM circuitry 704a may include a TX/RX switch 802 to switch between transmit mode and receive mode operation. The FEM circuitry 704a may include a receive signal path and a transmit signal path. The receive signal path of the FEM circuitry 704a may include a low-noise amplifier (LNA) 806 to amplify received RF signals 803 and provide the amplified received RF signals 807 as an output (e.g., to the radio IC circuitry 706a-b (FIG. 7)). The transmit signal path of the circuitry 704a may include a power amplifier (PA) to amplify input RF signals 809 (e.g., provided by the radio IC circuitry 706a-b), and one or more filters 812, such as band-pass filters (BPFs), low-pass filters (LPFs) or other types of filters, to generate RF signals 815 for subsequent transmission (e.g., by one or more of the antennas 701 (FIG. 7)) via an example duplexer 814.

In some dual-mode embodiments for Wi-Fi communication, the FEM circuitry 704a may be configured to operate in either the 2.4 GHz frequency spectrum or the 5 GHz frequency spectrum. In these embodiments, the receive signal path of the FEM circuitry 704a may include a receive signal path duplexer 804 to separate the signals from each spectrum as well as provide a separate LNA 806 for each spectrum as shown. In these embodiments, the transmit signal path of the FEM circuitry 704a may also include a power amplifier 810 and a filter 812, such as a BPF, an LPF or another type of filter for each frequency spectrum and a transmit signal path duplexer 804 to provide the signals of one of the different spectrums onto a single transmit path for subsequent transmission by the one or more of the antennas 701 (FIG. 7). In some embodiments, BT communications may utilize the 2.4 GHz signal paths and may utilize the same FEM circuitry 704a as the one used for WLAN communications.

Figure 9:
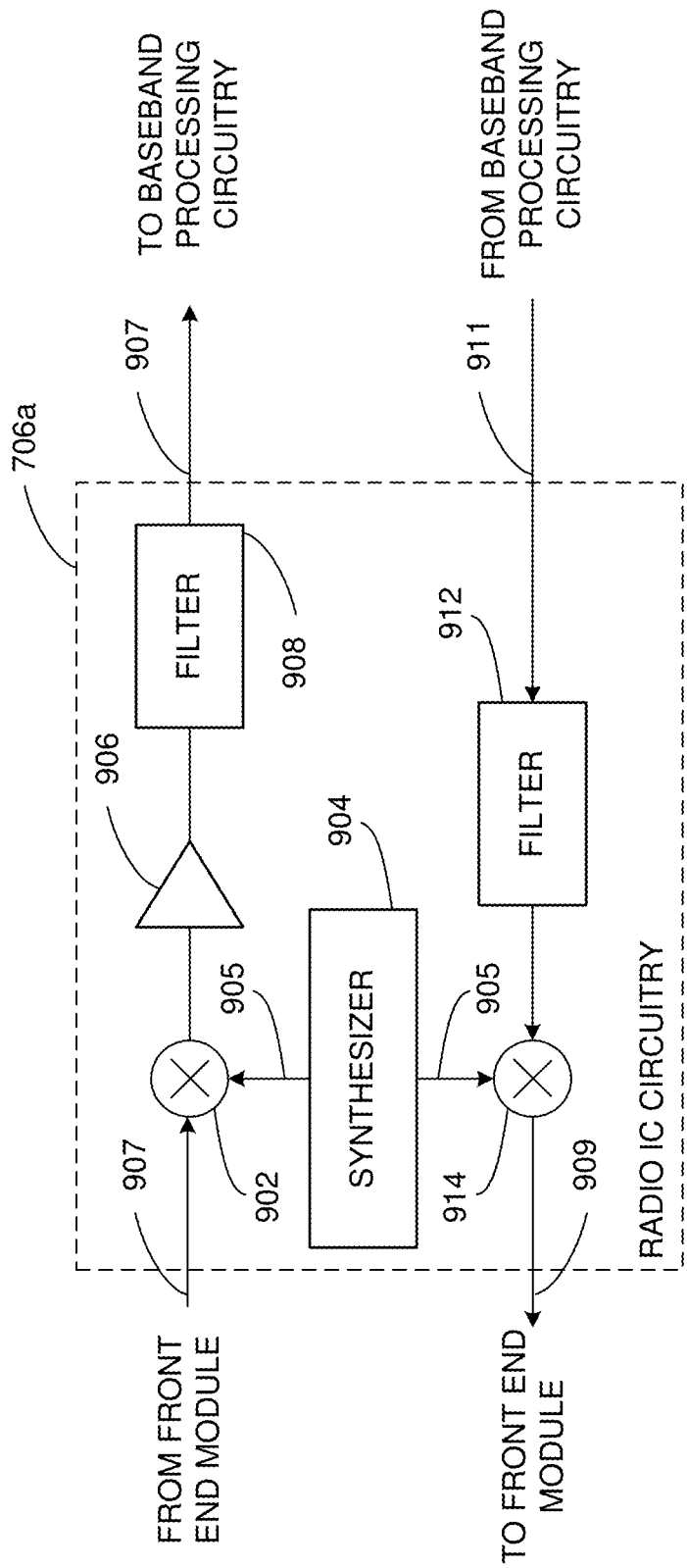
FIG. 9 illustrates an example radio IC circuitry for use in the radio architecture of FIG. 7, in accordance with one or more example embodiments of the present disclosure.

FIG. 9 illustrates radio IC circuitry 706a in accordance with some embodiments. The radio IC circuitry 706a is one example of circuitry that may be suitable for use as the WLAN or BT radio IC circuitry 706a/706b (FIG. 7), although other circuitry configurations may also be suitable. Alternatively, the example of FIG. 9 may be described in conjunction with the example BT radio IC circuitry 706b.

In some embodiments, the radio IC circuitry 706a may include a receive signal path and a transmit signal path. The receive signal path of the radio IC circuitry 706a may include at least mixer circuitry 902, such as, for example, down-conversion mixer circuitry, amplifier circuitry 906 and filter circuitry 908. The transmit signal path of the radio IC circuitry 706a may include at least filter circuitry 912 and mixer circuitry 914, such as, for example, up-conversion mixer circuitry. Radio IC circuitry 706a may also include synthesizer circuitry 904 for synthesizing a frequency 905 for use by the mixer circuitry 902 and the mixer circuitry 914. The mixer circuitry 902 and/or 914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 9 illustrates only a simplified version of a radio IC circuitry, and may include, although not shown, embodiments where each of the depicted circuitries may include more than one component. For instance, mixer circuitry 914 may each include one or more mixers, and filter circuitries 908 and/or 912 may each include one or more filters, such as one or more BPFs and/or LPFs according to application needs. For example, when mixer circuitries are of the direct-conversion type, they may each include two or more mixers.

In some embodiments, mixer circuitry 902 may be configured to down-convert RF signals XZY07 received from the FEM circuitry 704a-b (FIG. 7) based on the synthesized frequency 905 provided by synthesizer circuitry 904. The amplifier circuitry 906 may be configured to amplify the down-converted signals and the filter circuitry 908 may include an LPF configured to remove unwanted signals from the down-converted signals to generate output baseband signals 907. Output baseband signals 907 may be provided to the baseband processing circuitry 708a-b (FIG. 7) for further processing. In some embodiments, the output baseband signals 907 may be zero-frequency baseband signals, although this is not a requirement. In some embodiments, mixer circuitry 902 may comprise passive mixers, although the scope of the embodiments is not limited in this respect.

In some embodiments, the mixer circuitry 914 may be configured to up-convert input baseband signals 911 based on the synthesized frequency 905 provided by the synthesizer circuitry 904 to generate RF output signals XZY09 for the FEM circuitry 704a-b. The baseband signals 911 may be provided by the baseband processing circuitry 708a-b and may be filtered by filter circuitry 912. The filter circuitry 912 may include an LPF or a BPF, although the scope of the embodiments is not limited in this respect.

In some embodiments, the mixer circuitry 902 and the mixer circuitry 914 may each include two or more mixers and may be arranged for quadrature down-conversion and/or up-conversion respectively with the help of synthesizer 904. In some embodiments, the mixer circuitry 902 and the mixer circuitry 914 may each include two or more mixers each configured for image rejection (e.g., Hartley image rejection). In some embodiments, the mixer circuitry 902 and the mixer circuitry 914 may be arranged for direct down-conversion and/or direct up-conversion, respectively. In some embodiments, the mixer circuitry 902 and the mixer circuitry 914 may be configured for super-heterodyne operation, although this is not a requirement.

Mixer circuitry 902 may comprise, according to one embodiment: quadrature passive mixers (e.g., for the in-phase (I) and quadrature phase (Q) paths). In such an embodiment, RF input signal XZY07 from FIG. 9 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 905 of synthesizer 904 (FIG. 9). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal XZY07 (FIG. XZY) may comprise a balanced signal, although the scope of the embodiments is not limited in this respect. The I and Q baseband output signals may be provided to low-noise amplifier, such as amplifier circuitry 906 (FIG. 9) or to filter circuitry 908 (FIG. 9).

In some embodiments, the output baseband signals 907 and the input baseband signals 911 may be analog baseband signals, although the scope of the embodiments is not limited in this respect. In some alternate embodiments, the output baseband signals 907 and the input baseband signals 911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 904 may be a fractional-N synthesizer or a fractional N/N+1 synthesizer, although the scope of the embodiments is not limited in this respect as other types of frequency synthesizers may be suitable. For example, synthesizer circuitry 904 may be a delta-sigma synthesizer, a frequency multiplier, or a synthesizer comprising a phase-locked loop with a frequency divider. According to some embodiments, the synthesizer circuitry 904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 904 may be provided by a voltage controlled oscillator (VCO), although that is not a requirement. A divider control input may further be provided by either the baseband processing circuitry 708*a-b* (FIG. 7) depending on the desired output frequency 905. In some embodiments, a divider control input (e.g., N) may be determined from a look-up table (e.g., within a Wi-Fi card) based on a channel number and a channel center frequency as determined or indicated by the example application processor 710. The application processor 710 may include, or otherwise be connected to, one of the example secure signal converter 101 or the example received signal converter 103 (e.g., depending on which device the example radio architecture is implemented in).

In some embodiments, synthesizer circuitry 904 may be configured to generate a carrier frequency as the output frequency 905, while in other embodiments, the output frequency 905 may be a fraction of the carrier frequency (e.g., one-half the carrier frequency, one-third the carrier frequency). In some embodiments, the output frequency 905 may be a LO frequency (fLO).

Figure 10:
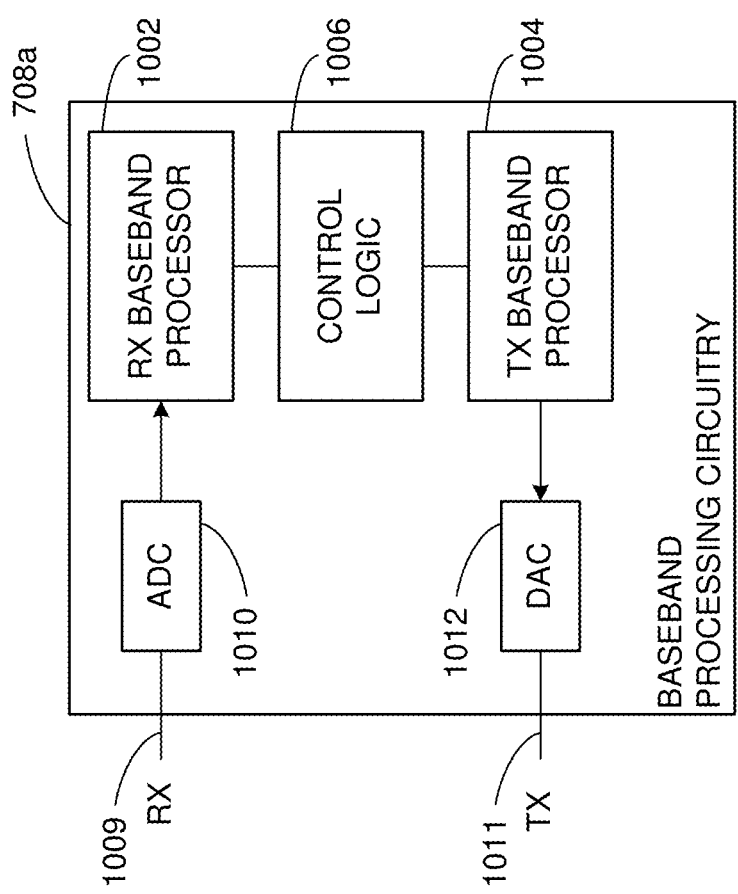
FIG. 10 illustrates an example baseband processing circuitry for use in the radio architecture of FIG. 7, in accordance with one or more example embodiments of the present disclosure.

FIG. 10 illustrates a functional block diagram of baseband processing circuitry 708*a* in accordance with some embodiments. The baseband processing circuitry 708*a* is one example of circuitry that may be suitable for use as the baseband processing circuitry 708*a* (FIG. 7), although other circuitry configurations may also be suitable. Alternatively, the example of FIG. 9 may be used to implement the example BT baseband processing circuitry 708*b* of FIG. 7.

The baseband processing circuitry 708*a* may include a receive baseband processor (RX BBP) 1002 for processing receive baseband signals 909 provided by the radio IC circuitry 706*a-b* (FIG. 7) and a transmit baseband processor (TX BBP) 1004 for generating transmit baseband signals 911 for the radio IC circuitry 706*a-b*. The baseband processing circuitry 708*a* may also include control logic 1006 for coordinating the operations of the baseband processing circuitry 708*a*.

In some embodiments (e.g., when analog baseband signals are exchanged between the baseband processing circuitry 708*a-b* and the radio IC circuitry 706*a-b*), the baseband processing circuitry 708*a* may include ADC 1010 to convert analog baseband signals 1009 received from the radio IC circuitry 706*a-b* to digital baseband signals for processing by the RX BBP 1002. In these embodiments, the baseband processing circuitry 708*a* may also include DAC 1012 to convert digital baseband signals from the TX BBP 1004 to analog baseband signals 1011.

In some embodiments that communicate OFDM signals or OFDMA signals, such as through baseband processor 708*a*, the transmit baseband processor 1004 may be configured to generate OFDM or OFDMA signals as appropriate for transmission by performing an inverse fast Fourier transform (IFFT). The receive baseband processor 1002 may be configured to process received OFDM signals or OFDMA signals by performing an FFT. In some embodiments, the receive baseband processor 1002 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 7, in some embodiments, the antennas 701 (FIG. 7) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 701 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may be a NAN device comprising memory and processing circuitry configured to: generate a first NAN frame comprising a first indication of a NAN operation capability in a 6 GHz frequency band, and a second indication of a transmit power of the NAN device in the 6 GHz frequency band; cause to send the first NAN frame using a frequency band different than the 6 GHz frequency band; identify a second NAN frame received from a second NAN device, the second NAN frame received using the frequency band and comprising a third indication of the NAN operation capability in the 6 GHz frequency band, and a fourth indication of a transmit power of the second NAN device in the 6 GHz frequency band; determine, based on the transmit power of the NAN device in the 6 GHz frequency band and the transmit power of the second NAN device in the 6 GHz frequency band, an operation parameter associated with Automated Frequency Coordination (AFC) in the 6 GHz frequency band; and establish, based on the operation parameter, a NAN connection between the device and the second NAN device for NAN operations, the NAN connection using the 6 GHz frequency band.

Example 2 may include the device of example 1 and/or some other example herein, wherein the first NAN frame comprises a Device Capability Attribute having a Supported Bands field consisting of eight bits, wherein a seventh bit of the eight bits comprises the first indication.

Example 3 may include the device of example 1 and/or some other example herein, wherein the first NAN frame comprises a Capabilities field, wherein a fourth bit of the Capabilities field comprises a fifth indication of an AFC capability.

Example 4 may include the device of example 1 and/or some other example herein, wherein the first NAN frame comprises a 6 GHz Wireless Local Area Network (WLAN) Infrastructure Attribute having an access point (AP) Transmit Power Mode field consisting of eight bits, wherein the eight bits comprise the second indication.

Example 5 may include the device of example 1 and/or some other example herein, wherein the first NAN frame comprises an Entry Control field, wherein a fourteenth bit and a fifteenth bit of the Entry Control field comprise the second indication.

Example 6 may include the device of example 1 and/or some other example herein, wherein to determine the operation parameter comprises to determine, based on the first NAN frame and the second NAN frame, that at least one of the NAN device or the second NAN device is a Standard Power AFC device, wherein to establish the NAN connection is based on the determination that at least one of the NAN device or the second NAN device is a Standard Power AFC device.

Example 7 may include the device of example 6 and/or some other example herein, wherein to establish the NAN connection comprises to establish the NAN connection using a first portion of the 6 GHz frequency band from 5925 MHz to 6425 MHz or using a second portion of the 6 GHz frequency band from 6525 MHz to 6875 MHz.

Example 8 may include the device of example 1 and/or some other example herein, wherein to determine the operation parameter comprises to determine, based on the first NAN frame and the second NAN frame, that the NAN device and the second NAN device are Low-Power Indoor (LPI) devices or Very Low-Power (VLP) devices, wherein the operation parameter indicates an absence of a requirement for the NAN device and the second NAN device to have an AFC capability, wherein to establish the NAN connection is based on the absence.

Example 9 may include the device of example 1 and/or some other example herein, wherein the second indication is indicative of a first connection between the NAN device and an AP device or the fourth indication is indicative of a second connection between the second NAN device and the AP device, wherein the operation parameter is based on the first connection or the second connection.

Example 10 may include the device of example 1 and/or some other example herein, further comprising a transceiver configured to transmit and receive wireless signals.

Example 11 may include the device of example 10 and/or some other example herein, further comprising one or more antennas coupled to the transceiver.

Example 12 may include a non-transitory computer-readable medium storing computer-executable instructions which when executed by one or more processors result in performing operations comprising: generating, by a first neighbor awareness networking (NAN) device a first NAN frame comprising a first indication of a NAN operation capability in a 6 GHz frequency band, and a second indication of a transmit power of the first NAN device in the 6 GHz frequency band; causing to send the first NAN frame using a frequency band different than the 6 GHz frequency band; identifying a second NAN frame received from a second NAN device, the second NAN frame received using the frequency band and comprising a third indication of the NAN operation capability in the 6 GHz frequency band, and a fourth indication of a transmit power of the second NAN device in the 6 GHz frequency band; determining, based on the transmit power of the first NAN device in the 6 GHz frequency band and the transmit power of the second NAN device in the 6 GHz frequency band, an operation parameter associated with Automated Frequency Coordination (AFC) in the 6 GHz frequency band; and establishing, based on the operation parameter, a NAN connection between the first NAN device and the second NAN device for NAN operations, the NAN connection using the 6 GHz frequency band.

Example 13 may include the non-transitory computer-readable medium of example 12 and/or some other example herein, wherein the first NAN frame comprises a Device Capability Attribute having a Supported Bands field consisting of eight bits, wherein a seventh bit of the eight bits comprises the first indication.

Example 14 may include the non-transitory computer-readable medium of example 12 and/or some other example herein, wherein the first NAN frame comprises a Capabilities field, wherein a fourth bit of the Capabilities field comprises a fifth indication of an AFC capability.

Example 15 may include the non-transitory computer-readable medium of example 12 and/or some other example herein, wherein the first NAN frame comprises a 6 GHz Wireless Local Area Network (WLAN) Infrastructure Attribute having an access point (AP) Transmit Power Mode field consisting of eight bits, wherein the eight bits comprise the second indication.

Example 16 may include the non-transitory computer-readable medium of example 12 and/or some other example herein, wherein the first NAN frame comprises an Entry Control field, wherein a fourteenth bit and a fifteenth bit of the Entry Control field comprise the second indication.

Example 17 may include a method comprising: generating, by processing circuitry of a first NAN device, a first NAN frame comprising a first indication of a NAN operation capability in a 6 GHz frequency band, and a second indication of a transmit power of the first NAN device in the 6 GHz frequency band; causing to send, by the processing circuitry, the first NAN frame using a frequency band different than the 6 GHz frequency band; identifying, by the processing circuitry, a second NAN frame received from a second NAN device, the second NAN frame received using the frequency band and comprising a third indication of the NAN operation capability in the 6 GHz frequency band, and a fourth indication of a transmit power of the second NAN device in the 6 GHz frequency band; determining, by the processing circuitry, based on the transmit power of the first NAN device in the 6 GHz frequency band and the transmit power of the second NAN device in the 6 GHz frequency band, an operation parameter associated with Automated Frequency Coordination (AFC) in the 6 GHz frequency band; and establishing, by the processing circuitry, based on the operation parameter, a NAN connection between the first NAN device and the second NAN device for NAN operations, the NAN connection using the 6 GHz frequency band.

Example 18 may include the method of example 17 and/or some other example herein, wherein determining the operation parameter comprises determining, based on the first NAN frame and the second NAN frame, that at least one of the first NAN device or the second NAN device is a Standard Power AFC device, wherein establishing the NAN connection is based on the determination that at least one of the first NAN device or the second NAN device is a Standard Power AFC device.

Example 19 may include the method of example 18 and/or some other example herein, wherein establishing the NAN connection comprises establishing the NAN connection using a first portion of the 6 GHz frequency band from 5925 MHz to 6425 MHz or using a second portion of the 6 GHz frequency band from 6525 MHz to 6875 MHz.

Example 20 may include the method of example 17 and/or some other example herein, wherein determining the operation parameter comprises determining, based on the first NAN frame and the second NAN frame, that the first NAN device and the second NAN device are Low-Power Indoor (LPI) devices or Very Low-Power (VLP) devices, wherein the operation parameter indicates an absence of a requirement for the first NAN device and the second NAN device to have an AFC capability, wherein to establish the NAN connection is based on the absence.

Example 21 may include an apparatus comprising means for: generating a first NAN frame comprising a first indication of a NAN operation capability in a 6 GHz frequency band, and a second indication of a transmit power of the apparatus in the 6 GHz frequency band; causing to send the first NAN frame using a frequency band different than the 6 GHz frequency band; identifying a second NAN frame received from a second apparatus, the second NAN frame received using the frequency band and comprising a third indication of the NAN operation capability in the 6 GHz frequency band, and a fourth indication of a transmit power of the second apparatus in the 6 GHz frequency band; determining, based on the transmit power of the apparatus in the 6 GHz frequency band and the transmit power of the second apparatus in the 6 GHz frequency band, an operation parameter associated with Automated Frequency Coordination (AFC) in the 6 GHz frequency band; and establishing, based on the operation parameter, a NAN connection between the apparatus and the second apparatus for NAN operations, the NAN connection using the 6 GHz frequency band.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A neighbor awareness networking (NAN) device, the NAN device comprising processing circuitry coupled to non-transitory storage, the processing circuitry configured to:
generate a first NAN frame comprising a first indication of a NAN operation capability of providing a service by the NAN device in a 6 GHz frequency band, and a second indication of a transmit power of the NAN device in the 6 GHz frequency band;
cause to send the first NAN frame using a frequency band different than the 6 GHz frequency band;
identify a second NAN frame received from a second NAN device, the second NAN frame received using the frequency band and comprising a third indication of the NAN operation capability of providing the service by the second NAN device in the 6 GHz frequency band, and a fourth indication of a transmit power of the second NAN device in the 6 GHz frequency band;
determine, based on the transmit power of the NAN device in the 6 GHz frequency band and the transmit power of the second NAN device in the 6 GHz frequency band, an operation parameter associated with Automated Frequency Coordination (AFC) in the 6 GHz frequency band; and
establish, based on the operation parameter, a NAN connection between the device and the second NAN device for NAN operations, the NAN connection using the 6 GHz frequency band,
wherein to determine the operation parameter comprises to determine, based on the first NAN frame and the second NAN frame, that at least one of the NAN device or the second NAN device is a Standard Power AFC device, wherein to establish the NAN connection is based on the determination that at least one of the NAN device or the second NAN device is a Standard Power AFC device, and
wherein the second indication is indicative of a first connection between the NAN device and an access point (AP) device or the fourth indication is indicative of a second connection between the second NAN device and the AP device, wherein the operation parameter is based on the first connection or the second connection.

2. The NAN device of claim 1, wherein the first NAN frame comprises a Device Capability Attribute having a Supported Bands field consisting of eight bits, wherein a seventh bit of the eight bits comprises the first indication.

3. The NAN device of claim 1, wherein the first NAN frame comprises a Capabilities field, wherein a fourth bit of the Capabilities field comprises a fifth indication of an AFC capability.

4. The NAN device of claim 1, wherein the first NAN frame comprises a 6 GHz Wireless Local Area Network (WLAN) Infrastructure Attribute having an access point (AP) Transmit Power Mode field consisting of eight bits, wherein the eight bits comprise the second indication.

5. The NAN device of claim 1, wherein the first NAN frame comprises an Entry Control field, wherein a fourteenth bit and a fifteenth bit of the Entry Control field comprise the second indication.

6. The NAN device of claim 1, wherein to establish the NAN connection comprises to establish the NAN connection using a first portion of the 6 GHz frequency band from 5925 MHz to 6425 MHz or using a second portion of the 6 GHz frequency band from 6525 MHz to 6875 MHz.

7. The NAN device of claim 1, wherein the processing circuitry is further configured to determine, based on the first NAN frame or the second NAN frame, that the NAN device or the second NAN device is a Low-Power Indoor (LPI) device or a Very Low-Power (VLP) device.

8. The device of claim 1, further comprising a transceiver configured to transmit and receive wireless signals comprising at least one of the first NAN frame or the second NAN frame.

9. The device of claim 8, further comprising an antenna coupled to the transceiver.

10. A non-transitory computer-readable medium storing computer-executable instructions which when executed by one or more processors result in performing operations comprising:
- generating, by a first neighbor awareness networking (NAN) device a first NAN frame comprising a first indication of a NAN operation capability of providing a service by the NAN device in a 6 GHz frequency band, and a second indication of a transmit power of the first NAN device in the 6 GHz frequency band;
- causing to send the first NAN frame using a frequency band different than the 6 GHz frequency band;
- identifying a second NAN frame received from a second NAN device, the second NAN frame received using the frequency band and comprising a third indication of the NAN operation capability of providing the service by the second NAN device in the 6 GHz frequency band, and a fourth indication of a transmit power of the second NAN device in the 6 GHz frequency band;
- determining, based on the transmit power of the first NAN device in the 6 GHz frequency band and the transmit power of the second NAN device in the 6 GHz frequency band, an operation parameter associated with Automated Frequency Coordination (AFC) in the 6 GHz frequency band; and
- establishing, based on the operation parameter, a NAN connection between the first NAN device and the second NAN device for NAN operations, the NAN connection using the 6 GHz frequency band,
- wherein determining the operation parameter comprises determining, based on the first NAN frame and the second NAN frame, that at least one of the NAN device or the second NAN device is a Standard Power AFC device, wherein establishing the NAN connection is based on the determination that at least one of the NAN device or the second NAN device is a Standard Power AFC device, and
- wherein the second indication is indicative of a first connection between the NAN device and an access point (AP) device or the fourth indication is indicative of a second connection between the second NAN device and the AP device, wherein the operation parameter is based on the first connection or the second connection.

11. The non-transitory computer-readable medium of claim 10, wherein the first NAN frame comprises a Device Capability Attribute having a Supported Bands field consisting of eight bits, wherein a seventh bit of the eight bits comprises the first indication.

12. The non-transitory computer-readable medium of claim 10, wherein the first NAN frame comprises a Capabilities field, wherein a fourth bit of the Capabilities field comprises a fifth indication of an AFC capability.

13. The non-transitory computer-readable medium of claim 10, wherein the first NAN frame comprises a 6 GHz Wireless Local Area Network (WLAN) Infrastructure Attribute having an access point (AP) Transmit Power Mode field consisting of eight bits, wherein the eight bits comprise the second indication.

14. The non-transitory computer-readable medium of claim 10, wherein the first NAN frame comprises an Entry Control field, wherein a fourteenth bit and a fifteenth bit of the Entry Control field comprise the second indication.

15. A method for neighbor awareness networking (NAN) device communications, the method comprising:
- generating, by processing circuitry of a first NAN device, a first NAN frame comprising a first indication of a NAN operation capability of providing a service by the NAN device in a 6 GHz frequency band, and a second indication of a transmit power of the first NAN device in the 6 GHz frequency band;
- causing to send, by the processing circuitry, the first NAN frame using a frequency band different than the 6 GHz frequency band;
- identifying, by the processing circuitry, a second NAN frame received from a second NAN device, the second NAN frame received using the frequency band and comprising a third indication of the NAN operation capability of providing the service by the second NAN device in the 6 GHz frequency band, and a fourth indication of a transmit power of the second NAN device in the 6 GHz frequency band;
- determining, by the processing circuitry, based on the transmit power of the first NAN device in the 6 GHz frequency band and the transmit power of the second NAN device in the 6 GHz frequency band, an operation parameter associated with Automated Frequency Coordination (AFC) in the 6 GHz frequency band; and
- establishing, by the processing circuitry, based on the operation parameter, a NAN connection between the first NAN device and the second NAN device for NAN operations, the NAN connection using the 6 GHz frequency band,
- wherein determining the operation parameter comprises determining, based on the first NAN frame and the second NAN frame, that at least one of the NAN device or the second NAN device is a Standard Power AFC device, wherein establishing the NAN connection is based on the determination that at least one of the NAN device or the second NAN device is a Standard Power AFC device, and
- wherein the second indication is indicative of a first connection between the NAN device and an access point (AP) device or the fourth indication is indicative of a second connection between the second NAN device and the AP device, wherein the operation parameter is based on the first connection or the second connection.

16. The method of claim 15, wherein establishing the NAN connection comprises establishing the NAN connection using a first portion of the 6 GHz frequency band from 5925 MHz to 6425 MHz or using a second portion of the 6 GHz frequency band from 6525 MHz to 6875 MHz.

17. The method of claim 15, further comprising determining, based on the first NAN frame or the second NAN frame, that the first NAN device or the second NAN device is a Low-Power Indoor (LPI) device or a Very Low-Power (VLP) device.

18. The non-transitory computer-readable medium of claim 10, wherein establishing the NAN connection comprises establishing the NAN connection using a first portion of the 6 GHz frequency band from 5925 MHz to 6425 MHz or using a second portion of the 6 GHz frequency band from 6525 MHz to 6875 MHz.

19. The method of claim 15, wherein the first NAN frame comprises a Device Capability Attribute having a Supported Bands field consisting of eight bits, wherein a seventh bit of the eight bits comprises the first indication.

20. The method of claim 15, wherein the first NAN frame comprises a Capabilities field, wherein a fourth bit of the Capabilities field comprises a fifth indication of an AFC capability.

* * * * *